(12) United States Patent
Lasser

(10) Patent No.: US 10,574,687 B1
(45) Date of Patent: Feb. 25, 2020

(54) SYSTEMS AND METHODS FOR DYNAMIC REMOVAL OF AGENTS FROM NODES OF PENETRATION TESTING SYSTEMS

(71) Applicant: XM Cyber Ltd., Hertzelia (IL)

(72) Inventor: Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 16/662,206

(22) Filed: Oct. 24, 2019

Related U.S. Application Data

(60) Provisional application No. 62/778,941, filed on Dec. 13, 2018.

(51) Int. Cl.
| | |
|---|---|
| *G06F 21/57* | (2013.01) |
| *H04L 29/06* | (2006.01) |
| *G06F 8/61* | (2018.01) |
| *G06F 11/36* | (2006.01) |

(52) U.S. Cl.
CPC .......... *H04L 63/1433* (2013.01); *G06F 8/62* (2013.01); *G06F 11/3668* (2013.01); *G06F 21/577* (2013.01); *G06F 2221/033* (2013.01); *G06F 2221/034* (2013.01)

(58) Field of Classification Search
CPC ... G06F 11/3668; G06F 2221/033–034; G06F 21/577; H04L 63/1433
See application file for complete search history.

(56) References Cited

U.S. PATENT DOCUMENTS

| | | |
|---|---|---|
| 6,918,038 B1 | 7/2005 | Smith et al. |
| 6,952,779 B1 | 10/2005 | Cohen et al. |
| 7,013,395 B1 | 3/2006 | Swiler et al. |
| 7,296,092 B2 | 11/2007 | Nguyen |
| 7,757,293 B2 | 7/2010 | Caceres et al. |
| 8,001,589 B2 | 8/2011 | Ormazabal et al. |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Thaddeus J Plecha
(74) *Attorney, Agent, or Firm* — Marc Van Dyke; Momentum IP Group

(57) ABSTRACT

Systems and methods of carrying out a penetration testing campaign of a networked system by a penetration testing system, in which reconnaissance agent software modules are dynamically removed from at least one network node based on changing conditions in the tested networked system. The networked system includes multiple network nodes, and the penetration testing system includes a penetration testing software module and a reconnaissance agent software module installed on at least some network nodes of the multiple network nodes. For one network node, a dynamic Boolean uninstalling condition is evaluated, and in response to determining that the dynamic Boolean uninstalling condition is satisfied for that network node, the reconnaissance agent software module is uninstalled from that network node.

20 Claims, 14 Drawing Sheets

(56) References Cited

U.S. PATENT DOCUMENTS

| | | |
|---|---|---|
| 8,112,016 B2 | 2/2012 | Matsumoto et al. |
| 8,127,359 B2 | 2/2012 | Kelekar |
| 8,356,353 B2 | 1/2013 | Futoransky et al. |
| 8,365,289 B2 | 1/2013 | Russ et al. |
| 8,490,193 B2 | 7/2013 | Sarraute Yamada et al. |
| 8,650,651 B2 | 2/2014 | Podjamy et al. |
| 8,813,235 B2 | 8/2014 | Sidagni |
| 9,015,847 B1 | 4/2015 | Kaplan et al. |
| 9,076,013 B1 | 7/2015 | Bailey, Jr. et al. |
| 9,183,397 B2 | 11/2015 | Futoransky et al. |
| 9,215,245 B1* | 12/2015 | Rajab ............... H04L 63/1433 |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,760,716 B1 | 9/2017 | Mulchandani |
| 9,800,603 B1 | 10/2017 | Sidagni |
| 10,038,711 B1 | 7/2018 | Gorodissky et al. |
| 10,068,095 B1 | 9/2018 | Segal et al. |
| 10,122,750 B2 | 11/2018 | Gorodissky et al. |
| 10,257,220 B2 | 4/2019 | Gorodissky |
| 10,367,846 B2 | 7/2019 | Gorodissky et al. |
| 10,382,473 B1 | 8/2019 | Ashkenazy et al. |
| 10,412,112 B2 | 9/2019 | Ashkenazy et al. |
| 10,440,044 B1 | 10/2019 | Zini et al. |
| 10,447,721 B2 | 10/2019 | Lasser |
| 10,454,966 B2 | 10/2019 | Gorodissky et al. |
| 10,462,177 B1 | 10/2019 | Lasser et al. |
| 10,469,521 B1 | 11/2019 | Segal et al. |
| 10,498,803 B1 | 12/2019 | Zini et al. |
| 10,505,969 B2 | 12/2019 | Gorodissky et al. |
| 2005/0086502 A1 | 4/2005 | Rayes et al. |
| 2005/0102534 A1 | 5/2005 | Wong |
| 2007/0204347 A1 | 8/2007 | Caceres et al. |
| 2008/0209567 A1 | 8/2008 | Lockhart et al. |
| 2008/0256638 A1 | 10/2008 | Russ et al. |
| 2008/0288822 A1 | 11/2008 | Wu et al. |
| 2009/0044277 A1 | 2/2009 | Aaron |
| 2009/0049553 A1 | 2/2009 | Vasudeva |
| 2009/0172813 A1 | 7/2009 | Aaron |
| 2010/0138925 A1 | 6/2010 | Barai et al. |
| 2011/0035803 A1 | 2/2011 | Lucangeli Obes et al. |
| 2011/0078507 A1* | 3/2011 | Choi ............... G06F 11/3668 714/32 |
| 2012/0174228 A1 | 7/2012 | Giakouminakis et al. |
| 2012/0255022 A1 | 10/2012 | Ocepek et al. |
| 2013/0014263 A1 | 1/2013 | Porcello et al. |
| 2013/0031635 A1 | 1/2013 | Lotem et al. |
| 2014/0137257 A1 | 5/2014 | Martinez et al. |
| 2014/0173739 A1 | 6/2014 | Ahuja et al. |
| 2014/0237606 A1 | 8/2014 | Futoransky et al. |
| 2015/0237063 A1* | 8/2015 | Cotton ............... H04L 63/1433 726/25 |
| 2016/0044057 A1 | 2/2016 | Chenette et al. |
| 2016/0134653 A1 | 5/2016 | Vallone et al. |
| 2016/0147635 A1* | 5/2016 | Schwarzmann .... G06F 11/3612 714/38.1 |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1* | 5/2017 | Patnaik ............... G06F 21/577 |
| 2017/0279843 A1 | 9/2017 | Schultz et al. |
| 2017/0373923 A1 | 12/2017 | Kazachkov et al. |
| 2018/0018465 A1* | 1/2018 | Carey ............... G06F 21/577 |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0365429 A1 | 12/2018 | Segal |
| 2019/0014141 A1 | 1/2019 | Segal et al. |
| 2019/0036961 A1 | 1/2019 | Gorodissky et al. |

FOREIGN PATENT DOCUMENTS

| | | |
|---|---|---|
| CN | 104009881 A | 8/2014 |
| EP | 1559008 A1 | 8/2005 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016164844 A1 | 10/2016 |
| WO | 2018156394 A1 | 8/2018 |

OTHER PUBLICATIONS

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

* cited by examiner

US 10,574,687 B1

SYSTEMS AND METHODS FOR DYNAMIC REMOVAL OF AGENTS FROM NODES OF PENETRATION TESTING SYSTEMS

RELATED APPLICATION

The present application gains priority from U.S. Provisional Patent Application 62/778,941 filed on Dec. 13, 2018 and entitled "Dynamic Removal of Agents for Penetration Testing Systems", which is incorporated herein by reference as if fully set forth herein.

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long, the organization might again end with a too long discovery period after a new threat appears.

In view of the above difficulties, several vendors are proposing automated penetration testing systems. These automated solutions reduce human involvement in the penetration testing process, or at least in some of its functions. Some such systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30 and optionally cleanup function code 50—for example, in combination with suitable hardware (e.g. one or more computing device(s) 110 and one or more processor(s) 120 thereof, see FIG. 2) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device 140), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

Penetration testing systems may employ different types of architectures, each having its advantages and disadvantages. Examples are actual attack penetration testing systems, simulated penetration testing systems and reconnaissance agent penetration testing systems. See the Definitions section for more details about these types of penetration testing systems.

The Problem to Solve

Penetration testing systems use various different architectures. One popular architecture is reconnaissance agent penetration testing. In penetration testing systems that use this architecture, the reconnaissance function is at least partially implemented by a reconnaissance agent software module installed in, and executed by, multiple network nodes of the tested networked system. Each reconnaissance agent installed in a network node collects data about its hosting node, and about incoming and outgoing communication messages of the hosting node. The reconnaissance agent reports the collected data, and/or conclusions derived from the collected data, to a central remote computing device of the penetration testing system.

U.S. Pat. No. 10,038,711 and US Patent Application No. 2018/0270268 both disclose a penetration testing system using the reconnaissance agent architecture and are both incorporated herein by reference in their entirety.

Typically, it is not essential that each and every network node of the tested networked system have a reconnaissance agent installed on the node during a penetration testing campaign. However, if a node is "interesting" for the purpose of penetration testing, and does not have a reconnaissance agent installed, the penetration testing campaign might miss opportunities for compromising the tested networked system, resulting in inaccurate testing which may lead to providing the organization owning the tested networked system with a false sense of security.

A node is "interesting" for the purpose of penetration testing if it satisfies at least one of the following conditions:
  (a) it is involved in activities that create opportunities for compromising the tested networked system; or (b) it is able to detect communication between nodes, which communication is useful for compromising the tested networked system.

For example, a node that frequently issues ARP requests, for resolving addresses of neighboring nodes, is of interest for penetration testing, as it creates opportunities for using the "ARP Spoofing" method of attack. Similarly, a node that provides a service which responds to requests on a given network port, when that service is known to be vulnerable to a given attack, is of interest for penetration testing, as that node may be attacked and compromised using the given attack.

One approach for using reconnaissance agents by a penetration testing system employs permanent installation of the agents. When the penetration testing system is first used in a tested networked system, an agent is permanently installed in each node of the networked system that is considered relevant to the testing. Once installed, the agent remains permanently installed in its hosting node. The agent will only be uninstalled by an explicit action of the network administrator or of some other authorized person.

Many organizations dislike having reconnaissance agent software modules permanently installed on their computing devices. As such, agents are typically provided by an outside entity, such as a security company providing the penetration testing system or service, and are often a cause for suspicion for an organization's CISO and/or system administrator. Even if the vendor of the reconnaissance agents is fully trusted, there is still a fear that, taking into account the broad access rights typically granted to penetration testing agents, a hostile entity might take control of the permanent agent and use it as a tool for compromising the agent's hosting node.

Consequently, non-permanent agents are frequently employed. One approach is to employ "a transient agent" that is installed by the penetration testing system before each penetration testing campaign begins, and automatically deletes itself after the campaign ends. A second approach is to employ "a non-persistent agent" that is automatically deleted from its hosting node when that node is rebooted. A third approach is to employ "a time-limited agent" that automatically deletes itself after a predetermined time lapses from the installation of the agent.

All the above types of non-permanent agents incur significant overhead prior to launching a new penetration testing campaign. Before a new campaign starts, a penetration testing system using any of the above non-permanent agent types must re-install a reconnaissance agent in each node from which such an agent was previously uninstalled, whether because of rebooting, exceeding the time limit or being a transient agent. This task of re-installing agents requires identifying the nodes that should have an agent and currently lack the agent. For example, such identifying may be carried out by the penetration testing remote computing device querying the reconnaissance agent of each node in the networked system, and identifying the nodes from which no response to the query is received. The re-installing task also requires downloading of the reconnaissance agent's code to each node that was found to currently lack an agent and then installing the agent in each such node. When considering large networked systems, for example having tens of thousands of nodes, the above task results in significant overhead of both time and computational power before starting a campaign.

There is thus a need in the art for a penetration testing system that uses non-permanent penetration testing agents without suffering from such overhead problems.

SUMMARY OF THE INVENTION

Some embodiments of the invention relate to methods and systems for carrying out automated penetration testing, in which reconnaissance agent software modules are dynamically removed from at least one network node based on changing conditions in the tested networked system.

According to an aspect of an embodiment of the invention, there is provided a method of carrying out a penetration testing campaign of a networked system including multiple network nodes by a penetration testing system, the penetration testing system including (A) a penetration testing software module installed on a remote computing device and (B) a reconnaissance agent software module installed on at least some network nodes of the multiple network nodes, the method including:

a. for one network node of the at least some network nodes, evaluating a dynamic Boolean uninstalling condition;

b. in response to determining that the dynamic Boolean uninstalling condition is satisfied for the one network node, uninstalling the reconnaissance agent software module from the one network node, wherein the dynamic Boolean uninstalling condition is a Boolean condition (i) that when evaluated for a given network node at two points in time, may produce different values even if network connectivity and an on/off state of the given network node do not change between the two points in time, (ii) that at a time of installing the reconnaissance agent software module on the given network node, for at least one future time point, it is not possible to predict a value of the Boolean condition for the given network node at the at least one future time point, and (iii) for which any evaluation of whether the Boolean condition is satisfied for the given network node does not depend solely on whether the given network node takes part in a penetration testing campaign at the time of the evaluation.

In some embodiments, the at least some network nodes of the multiple network nodes are all the multiple network nodes.

In some embodiments, the dynamic Boolean uninstalling condition depends on multiple dynamic Boolean sub-conditions, each dynamic Boolean sub-condition of the multiple dynamic Boolean sub-conditions being related to the one network node.

In some embodiments, the dynamic Boolean uninstalling condition depends on a static Boolean sub-condition related to the one network node, in addition to depending on one or more dynamic Boolean sub-conditions.

In some embodiments, the dynamic Boolean uninstalling condition depends on a given event type occurring at least a given number of times during a time interval of a given length immediately preceding the current time.

In some embodiments, the dynamic Boolean uninstalling condition depends on a given event type occurring at least a given number of times since the reconnaissance agent software module was last installed in the one network node.

In some embodiments, the evaluating of the dynamic Boolean uninstalling condition for the one network node is at least partially carried out by the reconnaissance agent software module installed on the one network node.

In some embodiments, the evaluating of the dynamic Boolean uninstalling condition for the one network node is at least partially carried out by the penetration testing software module installed on the remote computing device.

In some embodiments, the evaluating of the dynamic Boolean uninstalling condition for the one network node includes determining a value of the dynamic Boolean uninstalling condition at multiple points in time, wherein, for each point in time of the multiple points in time except a last of the multiple points in time, the value of the dynamic Boolean uninstalling condition is determined to be false for the one network node.

In some such embodiments, the determining of the value at the multiple points in time is automatically carried out according to a pre-defined schedule. In some of those embodiments, the pre-defined schedule is a periodic schedule selected from a group consisting of:
- a. once per a given number of seconds,
- b. once per a given number of minutes,
- c. once per a given number of hours,
- d. once per a given number of days,
- e. once per a given number of weeks,
- f. once per a given number of months.

In some other such embodiments, the determining of the value at the multiple points in time includes starting determining of the value for one of the multiple points in time in response to completing determining of the value for another of the multiple points in time.

In some embodiments, the uninstalling is permanently uninstalling. In some other embodiments, the uninstalling is temporarily uninstalling.

In some such embodiments, in which the uninstalling is permanently uninstalling, the reconnaissance agent software module includes a component that is executed when powering-up the one network node, wherein execution of the component determines whether the reconnaissance agent software module is currently temporarily uninstalled in the one network node.

Also, in some such embodiments in which the uninstalling is permanently uninstalling, the reconnaissance agent software module includes a component that is executed in response to the one network node receiving a command to re-install the reconnaissance agent software module, wherein execution of the component causes the reconnaissance agent software module to become active.

In some embodiments, the method further includes:
- c. re-installing the reconnaissance agent software module on at least one network node of the at least some network nodes from which the reconnaissance agent software module was previously uninstalled.

In some such embodiments, the re-installing of the reconnaissance agent software module is automatically carried out according to a pre-defined schedule. In some of those embodiments, the pre-defined schedule is a periodic schedule.

In some other such embodiments, the re-installing of the reconnaissance agent software module is carried out in response to a manual command.

In yet some other such embodiments, the re-installing of the reconnaissance agent software module is carried out in response to a given condition becoming satisfied.

According to a first aspect of another embodiment of the invention, there is provided a system for carrying out a penetration testing campaign of a networked system including multiple network nodes, each network node of the multiple network nodes including one or more node processors, the system including:
- a. a penetration testing computing device in communication with at least some network nodes of the multiple network nodes, the penetration testing computing device including:
  - i. one or more penetration testing processors; and
  - ii. a penetration testing non-transitory computer readable storage medium for instructions execution by the one or more penetration testing processors, the penetration testing non-transitory computer readable storage medium having stored:
    - A) data receiving instructions that, when executed by the one or more penetration testing processors, cause the penetration testing computing device to receive data from the at least some network nodes; and
    - B) campaign instructions that, when executed by the one or more penetration testing processors, cause the penetration testing computing device to carry out the penetration testing campaign for testing the networked system based on the data received from the at least some network nodes; and
- b. a reconnaissance agent non-transitory computer readable storage medium for instructions execution by the one or more node processors of one network node of the at least some network nodes, the reconnaissance agent non-transitory computer readable storage medium having stored:
  - i. reconnaissance agent instructions that, when executed by the one or more node processors of the one network node, cause the one network node to transmit from the one network node at least a portion of the data received by the penetration testing computing device;
  - ii. condition evaluation instructions that, when executed by the one or more node processors of the one network node, cause the one network node to evaluate a dynamic Boolean uninstalling condition for the one network node; and
  - iii. uninstalling instructions that, when executed by the one or more node processors of the one network node, cause the one network node to uninstall the reconnaissance agent instructions from the one network node, wherein the uninstalling instructions are executed in response to the condition evaluation instructions determining that the dynamic Boolean uninstalling condition is satisfied for the one network node, wherein the dynamic Boolean uninstalling condition is a Boolean condition (i) that when evaluated for a given network node at two points in time, may produce different values even if network connectivity and an on/off state of the given network node do not change between the two points in time, (ii) that at a time of installing the reconnaissance agent instructions on the given network node, for at least one future time point, it is not possible to predict a value of the Boolean condition for the given network node at the at least one future time point, and (iii) for which any evaluation of whether the Boolean condition is satisfied for the given network node does not depend solely on whether the given network node takes part in a penetration testing campaign at the time of the evaluation.

According to a second aspect of another embodiment of the invention, there is provided a system for carrying out a penetration testing campaign of a networked system including multiple network nodes, each network node of the multiple network nodes including one or more node processors, the system including:
- a. a reconnaissance agent non-transitory computer readable storage medium for instructions execution by the one or more node processors of one network node of the multiple network nodes, the reconnaissance agent non-transitory computer readable storage medium having stored:
    i. reconnaissance agent instructions that, when executed by the one or more node processors of the one network node, cause the one network node to transmit from the one network node data about the one network node; and
    ii. uninstalling instructions that, when executed by the one or more node processors of the one network node, cause the one network node to uninstall the reconnaissance agent instructions from the one network node; and
  b. a penetration testing computing device in communication with at least some network nodes of the multiple network nodes, wherein the at least some network nodes include the one network node, the penetration testing computing device including:
    i. one or more penetration testing processors; and
    ii. a penetration testing non-transitory computer readable storage medium for instructions execution by the one or more penetration testing processors, the penetration testing non-transitory computer readable storage medium having stored:
      A) data receiving instructions that, when executed by the one or more penetration testing processors, cause the penetration testing computing device to receive data from the at least some network nodes, the received data including the data about the one network node;
      B) campaign instructions that, when executed by the one or more penetration testing processors, cause the penetration testing computing device to carry out the penetration testing campaign for testing the networked system based on the data received from the at least some network nodes; and
      C) condition evaluation instructions that, when executed by the one or more penetration testing processors, cause the penetration testing computing device to evaluate a dynamic Boolean uninstalling condition for the one network node, the evaluation being based on the data about the one network node,
wherein the uninstalling instructions are executed by the one or more node processors of the one network node in response to the condition evaluation instructions determining that the dynamic Boolean uninstalling condition is satisfied for the one network node, and
wherein the dynamic Boolean uninstalling condition is a Boolean condition (i) that when evaluated for a given network node at two points in time, may produce different values even if network connectivity and an on/off state of the given network node do not change between the two points in time, (ii) that at a time of installing the reconnaissance agent instructions on the given network node, for at least one future time point, it is not possible to predict a value of the Boolean condition for the given network node at the at least one future time point, and (iii) for which any evaluation of whether the Boolean condition is satisfied for the given network node does not depend solely on whether the given network node takes part in a penetration testing campaign at the time of the evaluation.

In some embodiments of the first and second aspects, the at least some network nodes of the multiple network nodes are all the multiple network nodes.

In some embodiments of the first and second aspects, the dynamic Boolean uninstalling condition depends on multiple dynamic Boolean sub-conditions, each dynamic Boolean sub-condition of the multiple dynamic Boolean sub-conditions being related to the one network node.

In some embodiments of the first and second aspects, the dynamic Boolean uninstalling condition depends on a static Boolean sub-condition related to the one network node, in addition to depending on one or more dynamic Boolean sub-conditions.

In some embodiments of the first and second aspects, the dynamic Boolean uninstalling condition depends on a given event type occurring at least a given number of times during a time interval of a given length immediately preceding the current time.

In some embodiments of the first and second aspects, the dynamic Boolean uninstalling condition depends on a given event type occurring at least a given number of times since the reconnaissance agent software module was last installed in the one network node.

In some embodiments of the first and second aspects, the condition evaluation instructions include instructions to determine a value of the dynamic Boolean uninstalling condition at multiple points in time, wherein, for each point in time of the multiple points in time except a last of the multiple points in time, the value of the dynamic Boolean uninstalling condition is determined to be false for the one network node.

In some such embodiments, the instructions to determine the value at the multiple points in time are adapted to be automatically executed according to a pre-defined schedule. In some of those embodiments, the pre-defined schedule is a periodic schedule selected from a group consisting of:
  a. once per a given number of seconds,
  b. once per a given number of minutes,
  c. once per a given number of hours,
  d. once per a given number of days,
  e. once per a given number of weeks,
  f. once per a given number of months.

In some other such embodiments of the first and second aspects, execution of the instructions to determine the value at one of the multiple points in time is carried out in response to completion of execution of the instructions to determine the value at another of the multiple points in time.

In some embodiments of the first and second aspects, the uninstalling instructions are instructions to permanently uninstall the reconnaissance agent instructions from the one network node.

In some embodiments of the first and second aspects, the uninstalling instructions are instructions to temporarily uninstall the reconnaissance agent instructions from the one network node.

In some such embodiments in which the uninstalling instructions are instructions to temporarily uninstall the reconnaissance agent instructions, the reconnaissance agent non-transitory computer readable storage medium further has stored uninstall evaluation instructions, to be executed when powering-up the one network node, to determine whether the reconnaissance agent instructions are currently temporarily uninstalled from the one network node.

Also, in some such embodiments in which the uninstalling instructions are instructions to temporarily uninstall the reconnaissance agent instructions, the reconnaissance agent non-transitory computer readable storage medium further has stored re-installing instructions, to be executed in response to the one network node receiving a command to re-install the reconnaissance agent instructions, which, when executed by the one or more node processors of the one network node, cause the reconnaissance agent instructions to become active.

In some embodiments of the first and second aspects, the penetration testing non-transitory computer readable storage medium further has stored:

re-installing instructions, which, when executed by the one or more penetration testing processors, cause at least one network node of the at least some network nodes from which the reconnaissance agent instructions were previously uninstalled to re-install the reconnaissance agent instructions.

In some such embodiments, execution of the re-installing instructions is automatically carried out according to a pre-defined schedule. In some of those embodiments, the pre-defined schedule is a periodic schedule.

In other such embodiments, execution of the re-installing instructions is carried out in response to a manual command.

In yet other such embodiments, execution of the re-installing instructions is carried out in response to a given condition becoming satisfied.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF SOME EMBODIMENTS OF THE INVENTION

Figure 1A:
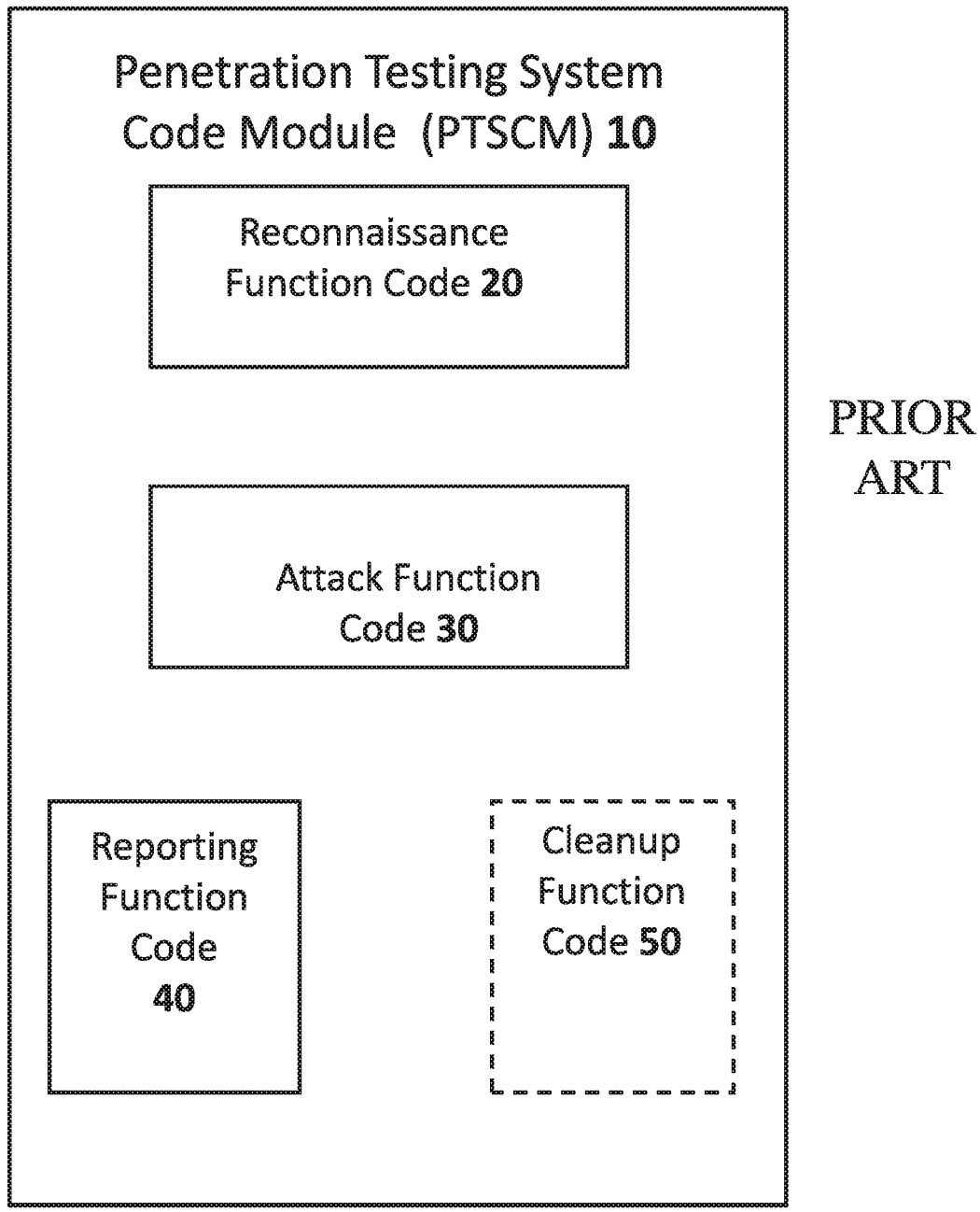
FIG. 1A (PRIOR ART) is a block diagram of code modules of a typical penetration testing system.
Figure 1B:
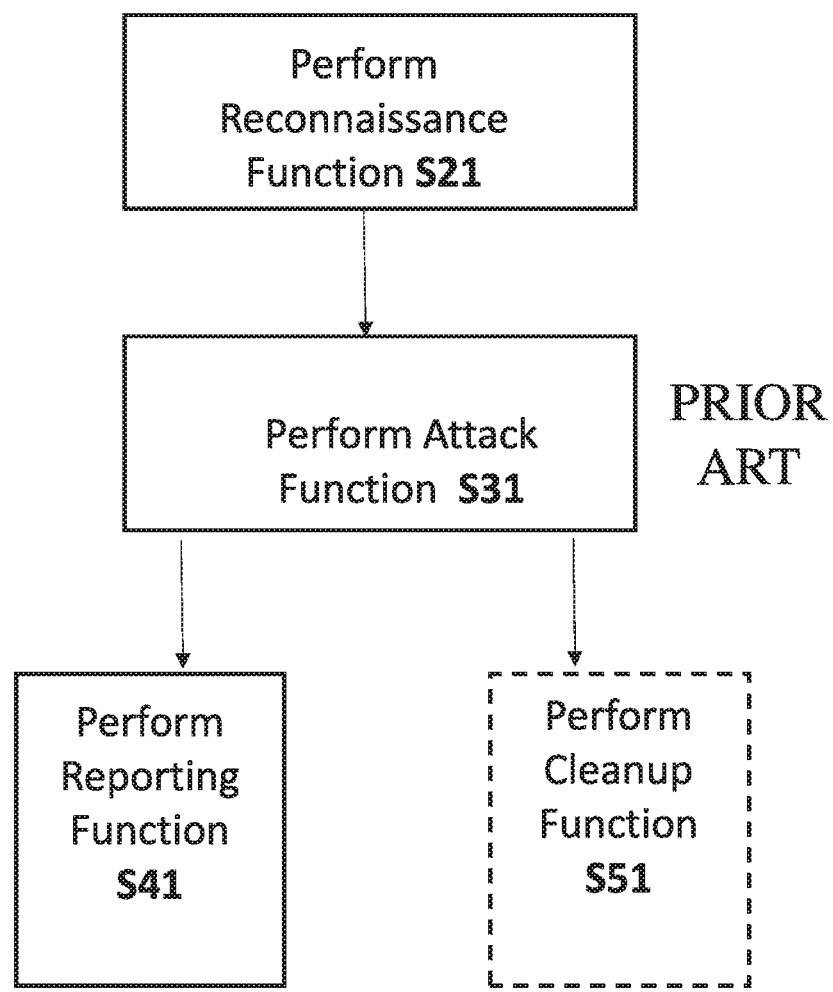
FIG. 1B (PRIOR ART) is a flow-chart related to the block diagram of FIG. 1A.
Figure 2:
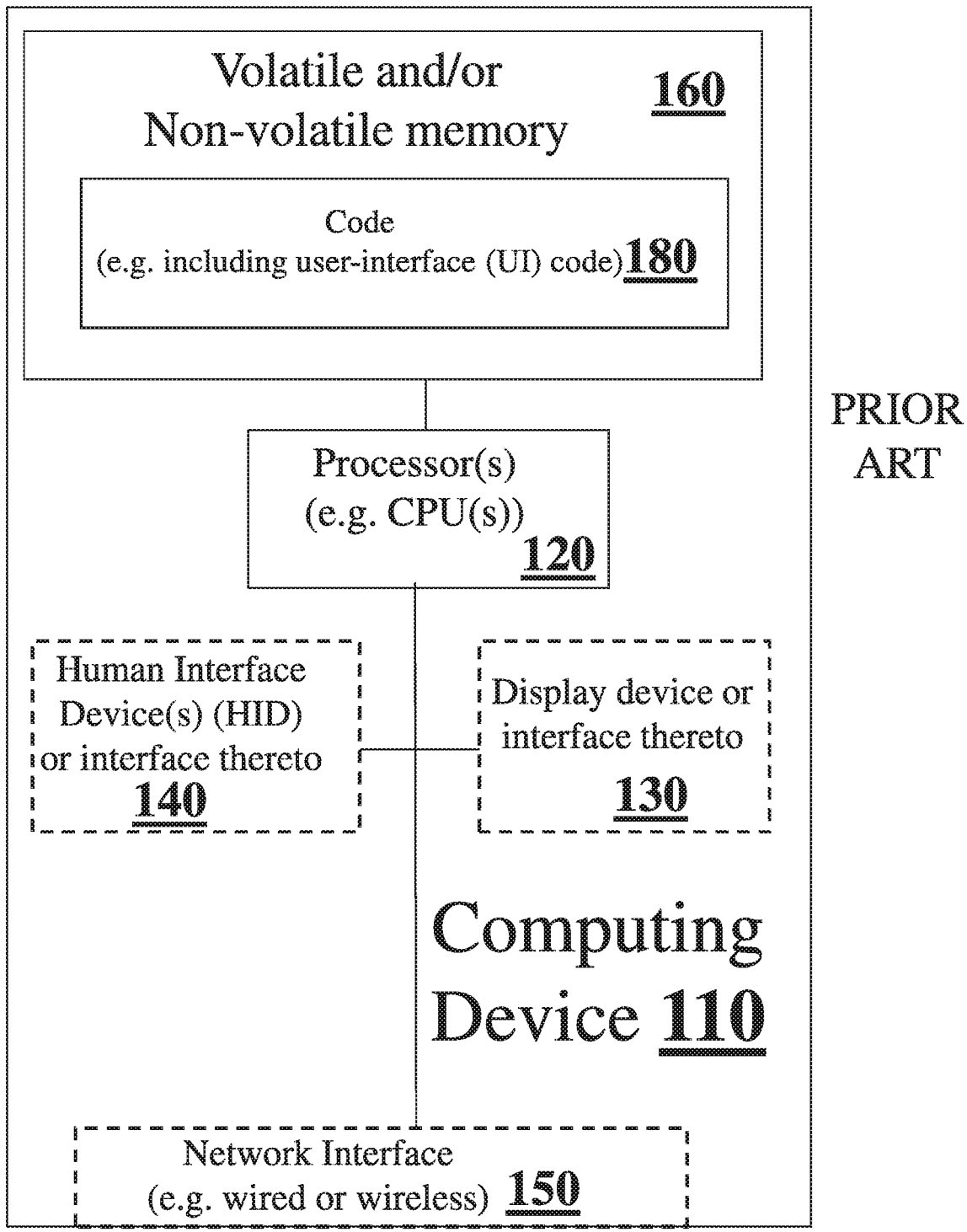
FIG. 2 (PRIOR ART) illustrates a prior art computing device.

The invention, in some embodiments, relates to penetration testing of a networked system using a reconnaissance agent architecture, and specifically to penetration testing systems and methods in which reconnaissance agent software modules are dynamically removed from at least one network node, during or between penetration testing campaigns.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically enables penetration testing using non-permanent reconnaissance agents while avoiding the overhead of uninstalling and reinstalling the agents.

The proposed solution is based on a non-permanent penetration testing agent whose uninstallation depends on a dynamic Boolean uninstalling condition, which condition is related to the hosting node. In other words, the reconnaissance agent of the proposed solution automatically uninstalls itself according to an evaluation of the value of a dynamic Boolean uninstalling condition related to the hosting node.

The dynamic Boolean uninstalling condition, used for deciding whether or not to uninstall an agent, is preferably a condition that is related to the "level of interest" of a network node for the purpose of penetration testing. The reasoning behind this is that if a node is determined to be "uninteresting", then no significant harm will be caused to the results of penetration testing campaigns by ignoring the uninteresting node during the campaigns. If, however, a node is determined to be "interesting", then it is advisable to keep its reconnaissance agent installed in order to obtain meaningful and reliable results from future campaigns.

Figure 3A:
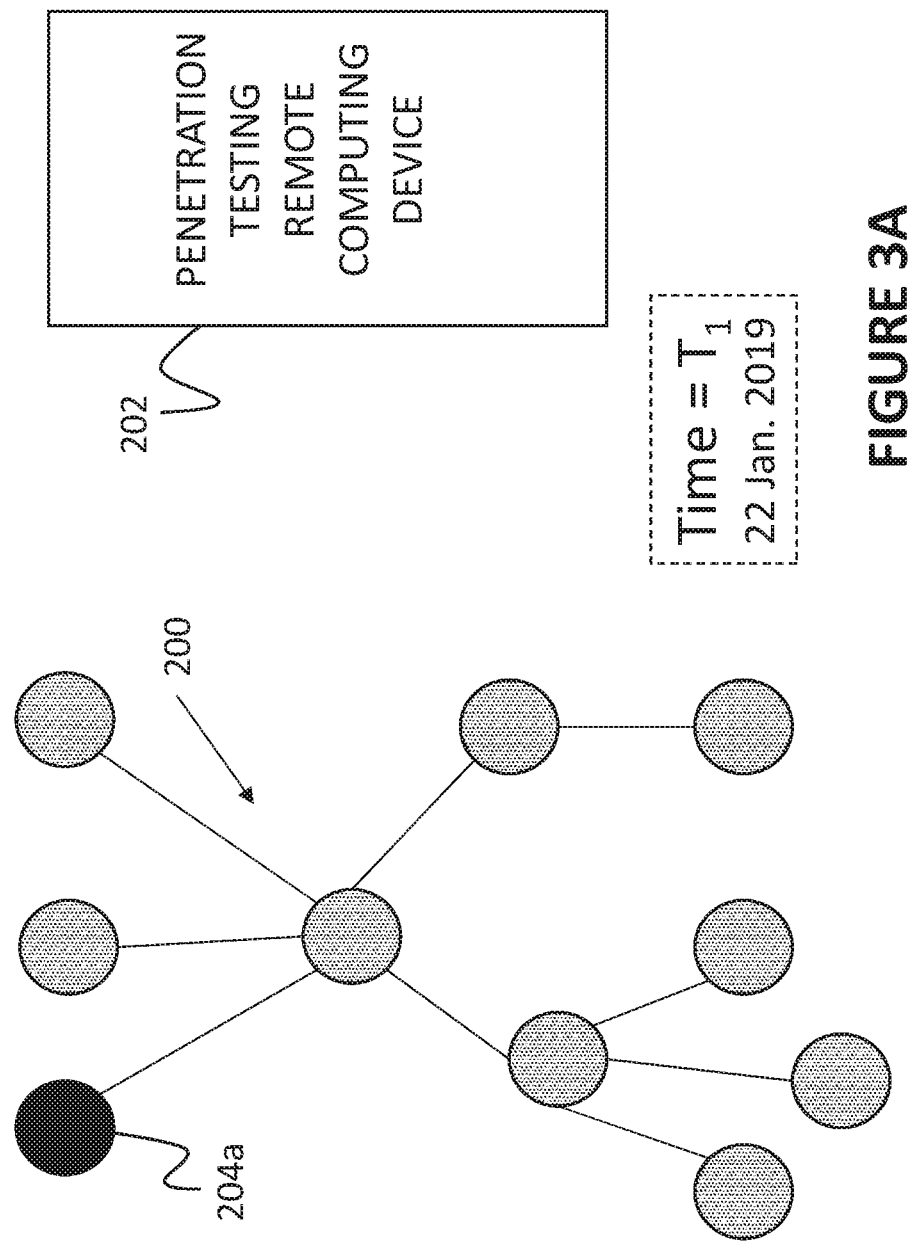
FIGS. 3A-3H are schematic illustrations of states of a tested networked system at different times during penetration testing using an embodiment of the penetration testing system and method of the present invention.
Figure 3B:
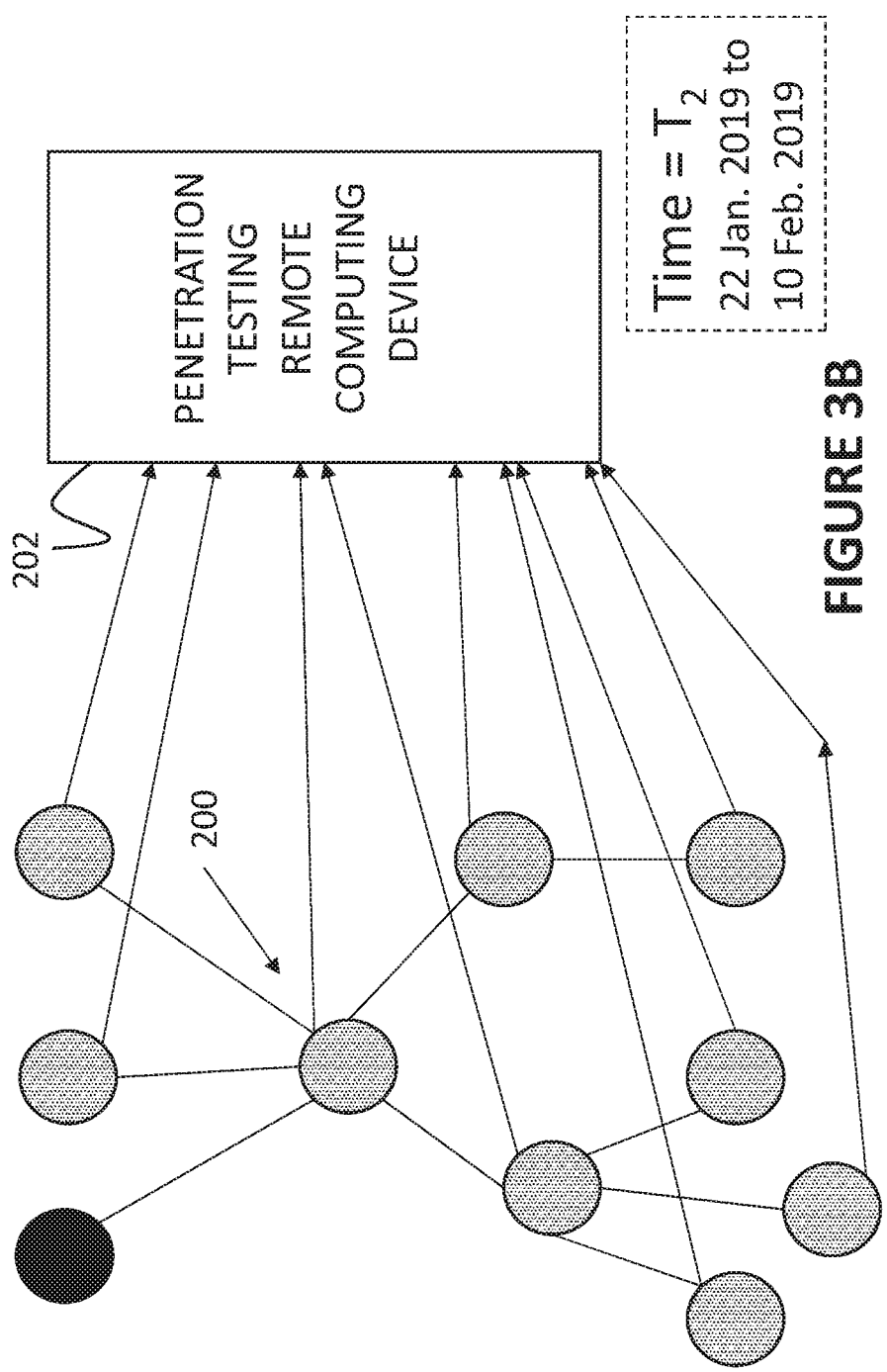
Figure 3C:
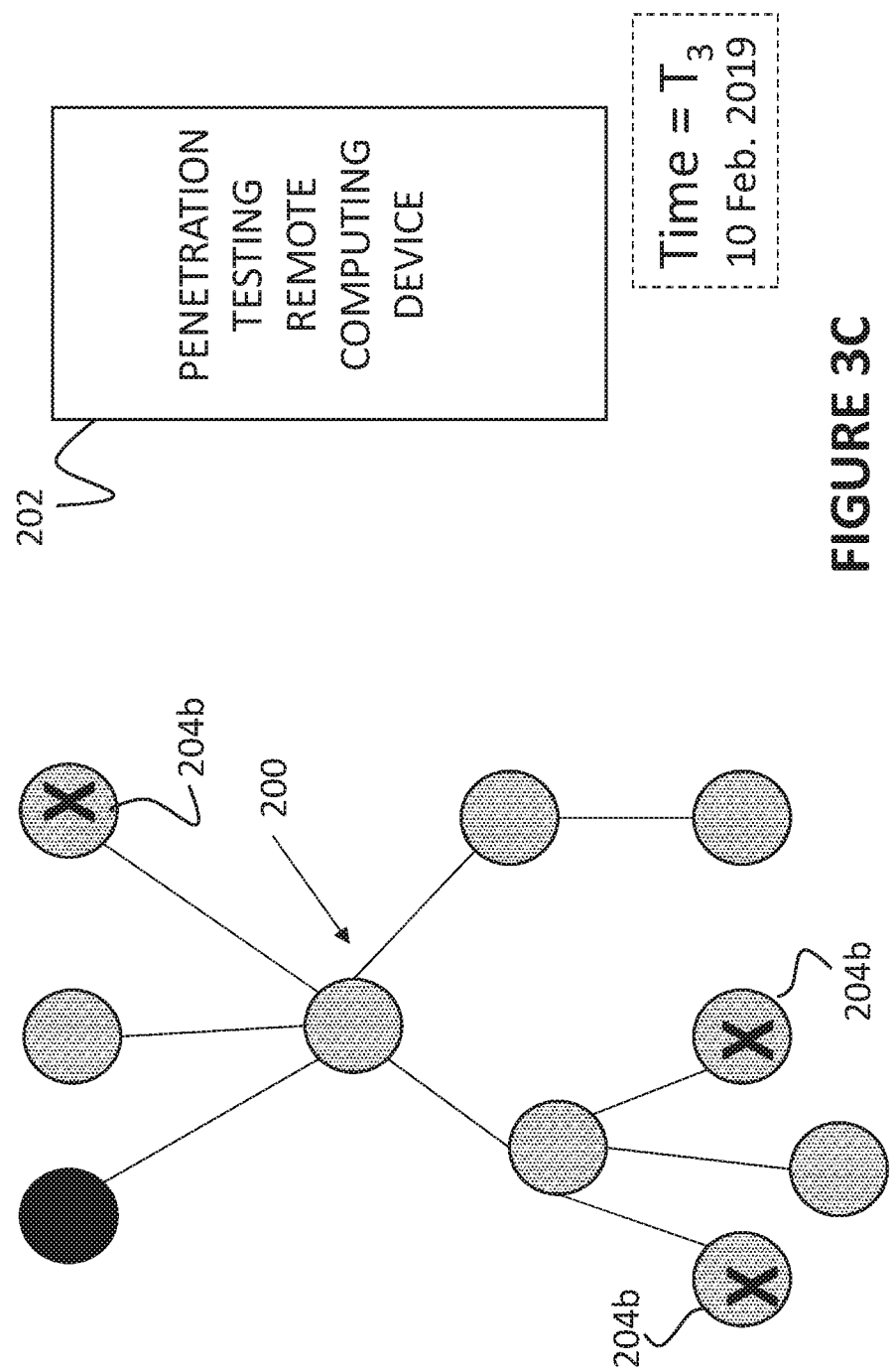
Figure 3D:
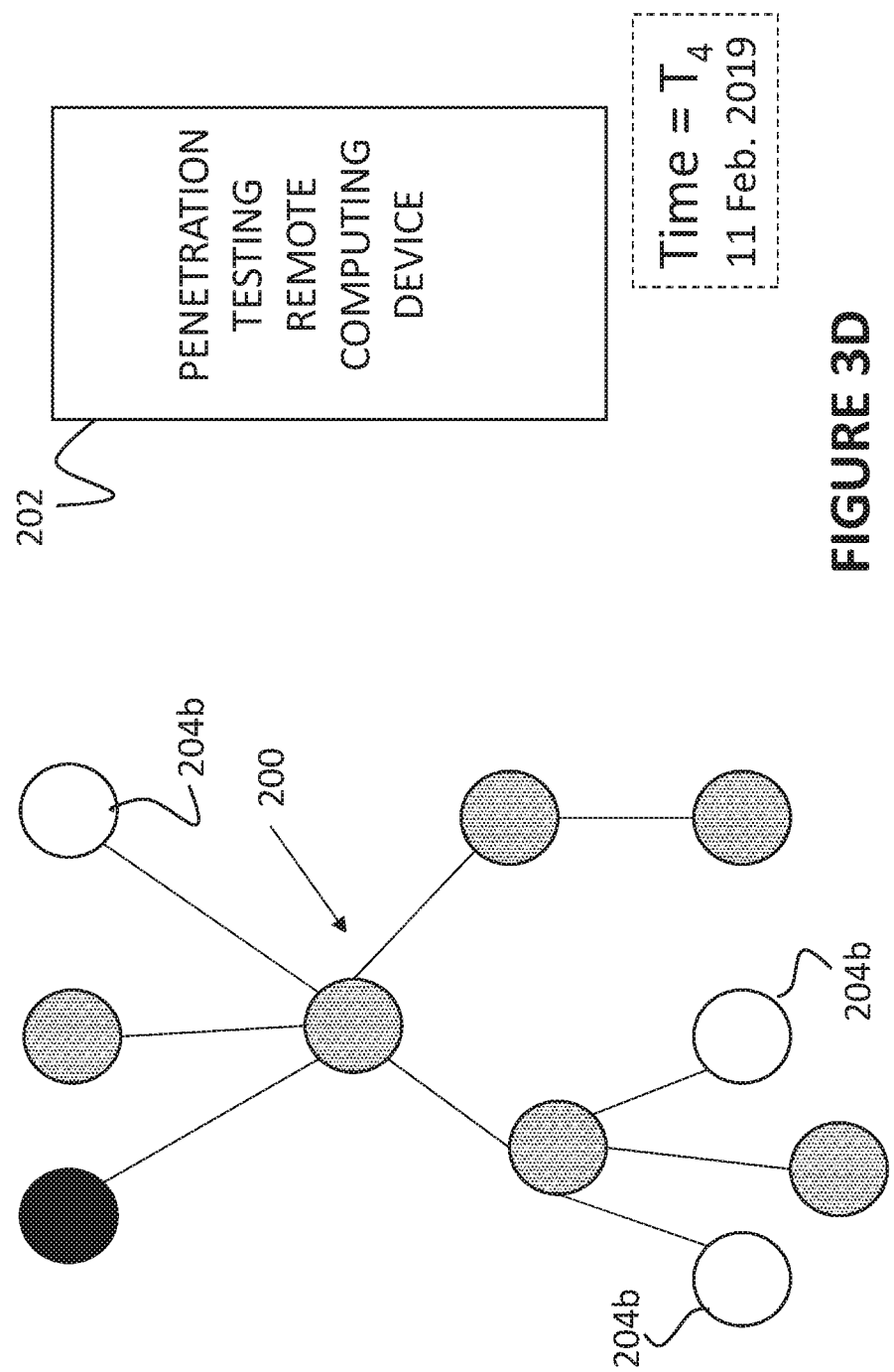
Figure 3E:
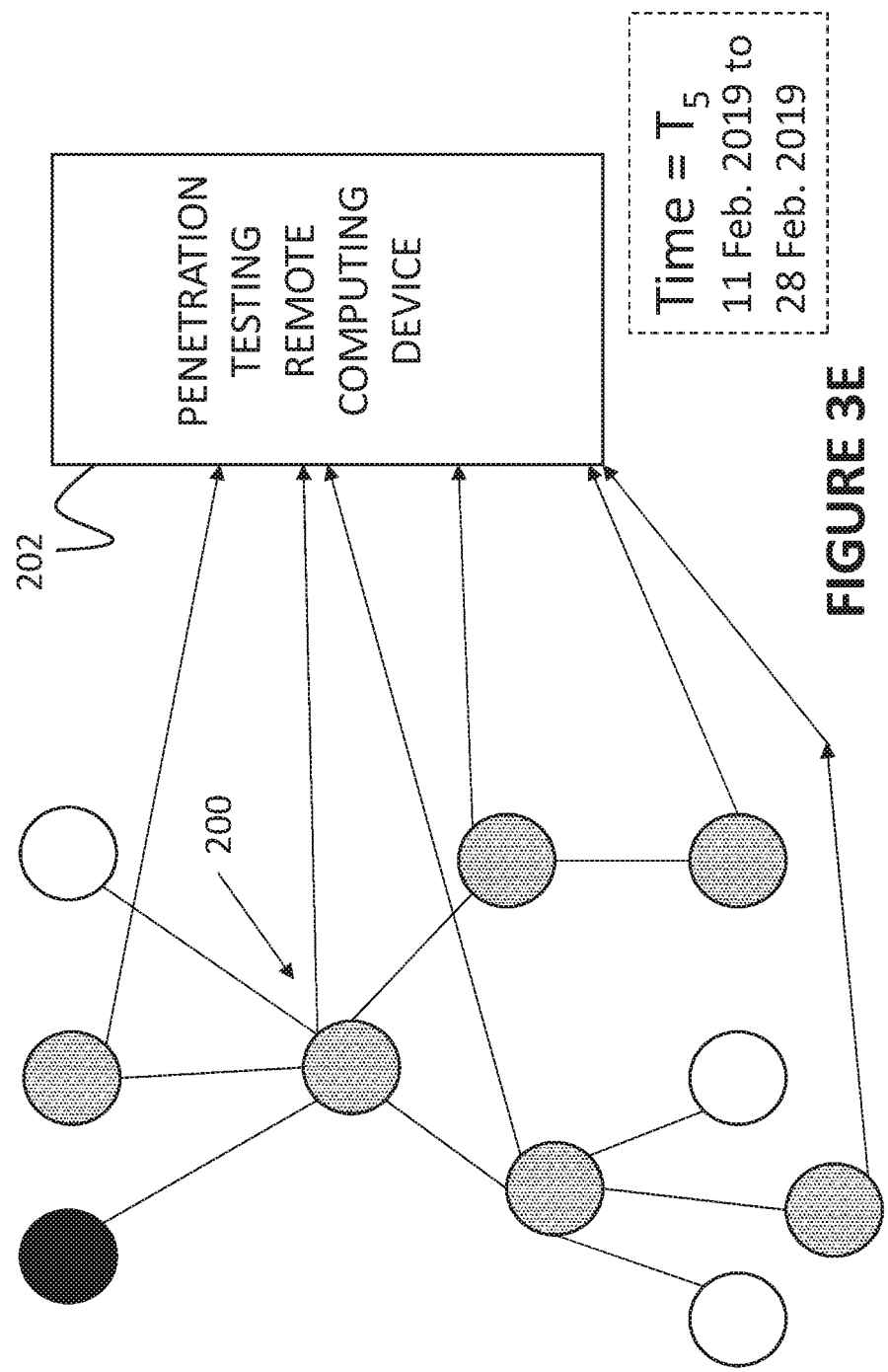
Figure 3F:
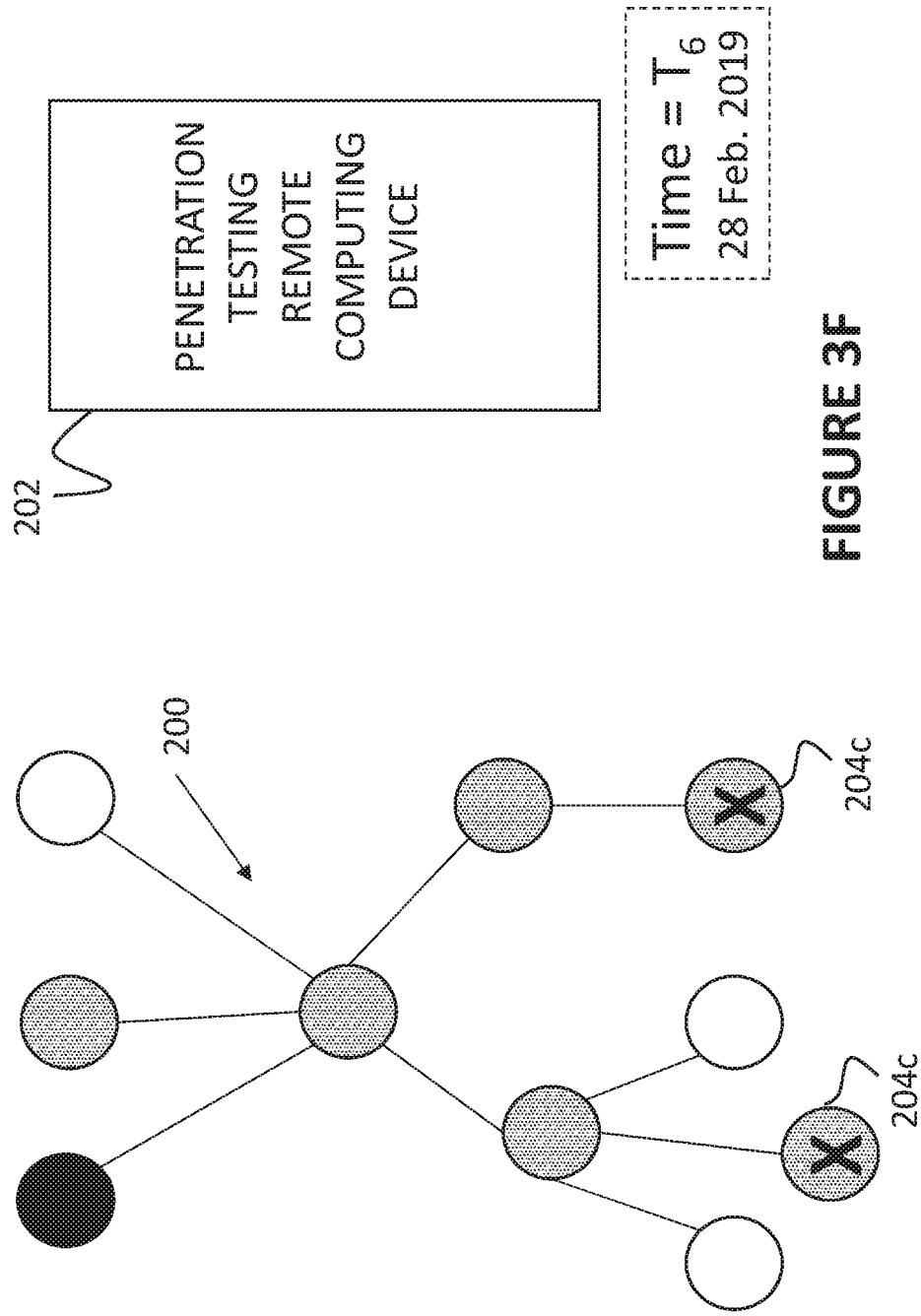
Figure 3G:
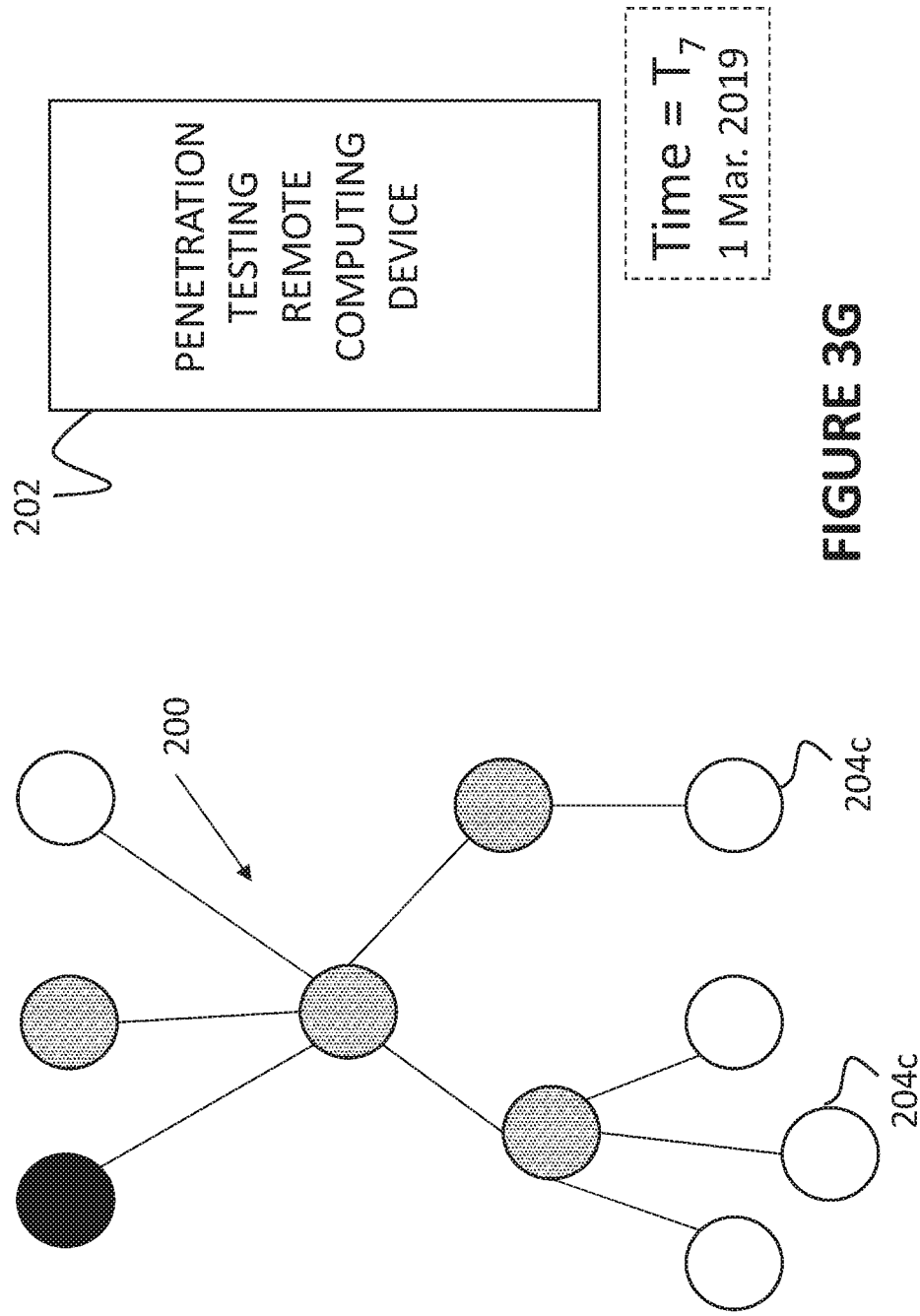

FIGS. 3A to 3H illustrate the sequence of states of a tested networked system 200, which occurs when using a penetration testing system (running on a penetration testing remote computing device 202) which uses non-permanent reconnaissance agents according to the disclosed technology. In FIGS. 3A to 3H, nodes of the tested networked system that have a reconnaissance agent installed are marked by having dots on the corresponding circle in the drawings, and nodes in which the reconnaissance agent is not installed are marked by a clear white circle. Nodes that are irrelevant to the penetration testing are marked in black. FIGS. 3A to 3H represent the same tested networked system, at different points in time. The sequence of states may be as follows:

a. Initially a reconnaissance agent is installed on each node of the tested networked system that is considered to be potentially relevant to the penetration testing, or "interesting" for the purpose of penetration testing. As seen in FIG. 3A, most of the nodes are marked as having reconnaissance agents installed thereon, but a specific node 204a is marked in black, indicating that this node is irrelevant to the penetration testing. It is appreciated that the state illustrated in FIG. 3A may occur at the time of initial installation of the reconnaissance agents, or may be the result of reinstallation of reconnaissance agents after a previous iteration, as explained in further detail hereinbelow.

b. A penetration testing campaign carried out right after initialization can collect information from all the nodes considered to be potentially relevant to the penetration testing, as all of them have an agent to carry out such collection of information and to submit the collected information to the penetration testing remote computing device. In FIG. 3B, all the nodes marked as having reconnaissance agents thereof transmit information to penetration testing remote computing device 202.

c. As time goes on, each of the installed agents automatically evaluates the dynamic Boolean uninstalling condition telling it whether it has to uninstall itself. It is appreciated that different installed agents may automatically evaluate the dynamic Boolean uninstalling condition at different times. As seen in FIG. 3C, at some later time (indicated by the date on the Figure), a state is reached in which each of the installed agents had already evaluated the dynamic Boolean uninstalling condition telling it whether it has to uninstall itself. For example, the dynamic Boolean uninstalling condition used in FIG. 3C may be "uninstall if and only if the hosting node has submitted fewer than two ARP requests in the last two weeks". As seen in FIG. 3C, some nodes 204b, in which the condition is met, are marked with an X within the circle of the node, while the representation of nodes in which the condition is not met remains unchanged relative to FIG. 3B.

d. As seen in FIG. 3D, as a result of the evaluation illustrated in FIG. 3C, the nodes 204b, in which the condition was met, have uninstalled their reconnaissance agents, such that their representation in FIG. 3D is by a clear white circle, indicating the lack of a reconnaissance agent.

e. A penetration testing campaign carried out at this stage can collect information only from nodes that still have an agent and are therefore considered "interesting". Consequently, as seen in FIG. 3E, only those nodes which have a reconnaissance agent installed and are marked by dots contribute to the campaign, by sending collected information to penetration testing remote computing device 202.

f. As seen in FIG. 3F, at some further time (indicated by the date on the Figure), each of the remaining installed agents had already automatically re-evaluated the same dynamic Boolean uninstalling condition to determine whether it has to uninstall itself. As seen in FIG. 3F, in some additional nodes 204c, the condition is met.

g. As seen in FIG. 3G, as a result of the evaluation carried out in FIG. 3F, the additional nodes 204c have uninstalled their reconnaissance agents.

h. A penetration testing campaign carried out at this stage can collect information only from nodes that still have an agent and are still considered "interesting" at this stage. Consequently, in FIG. 3H, only nodes which were not removed in state d or state g contribute to the campaign and send collected information to penetration testing remote computing device 202.

Figure 3H:
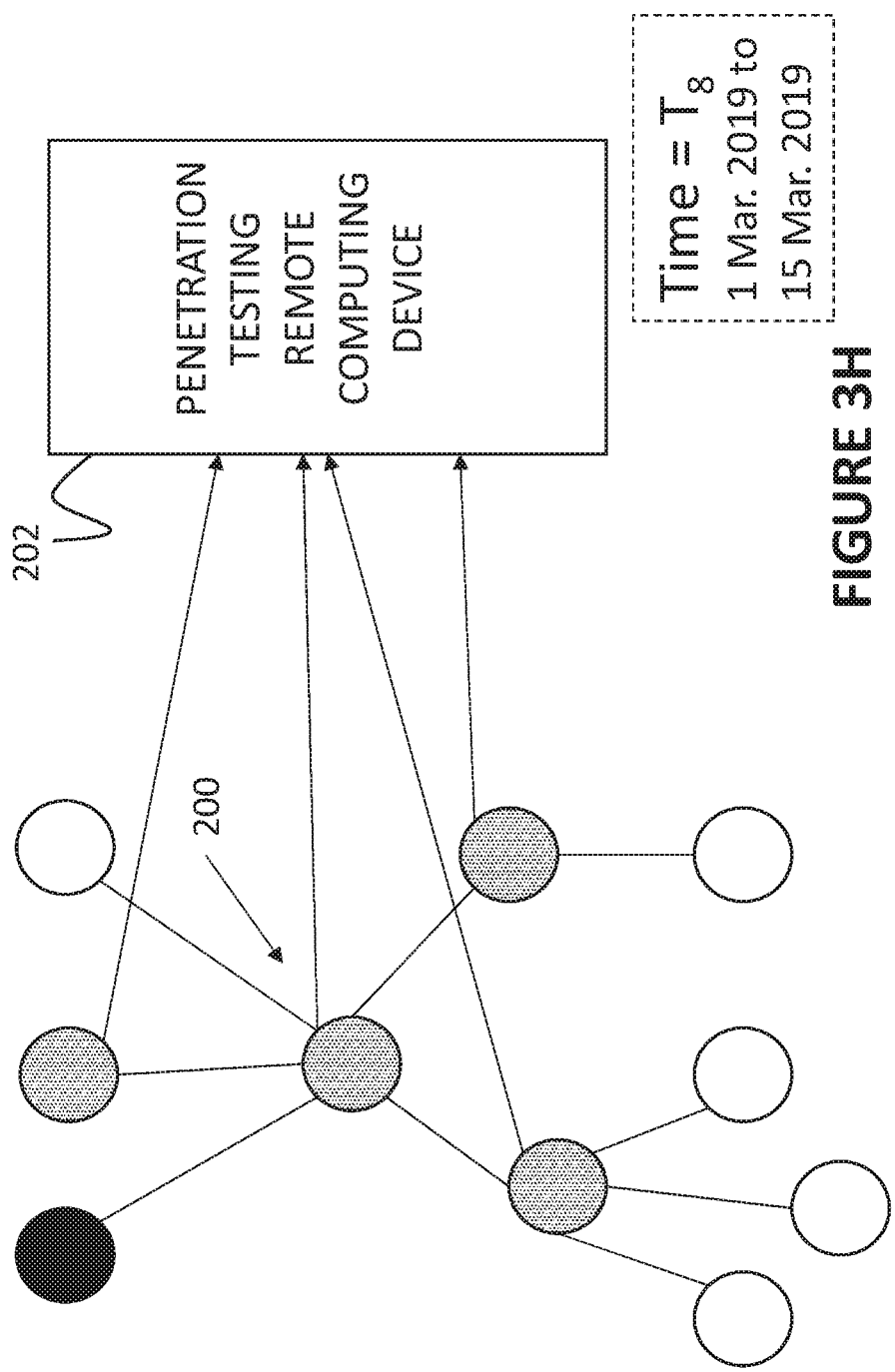

The process described by the states of FIGS. 3F-3H is iterative, and as such the steps demonstrated in those figures are repeated again and again until testing is stopped or until it is determined that the tested networked system should be re-initialized by re-installing agents on its nodes, as explained in further detail hereinbelow.

It is appreciated that the process illustrated by FIGS. 3A to 3H does not include re-installation of the agents before each campaign, as is common in the prior art, and thus avoids the significant overhead associated with such task.

An example of a dynamic Boolean uninstalling condition, or rule, used by the agents for deciding whether or not they should be uninstalled was defined with respect to FIGS. 3A to 3H, as being "uninstall if and only if the hosting node has submitted fewer than two ARP requests in the last two weeks", which may be stated differently as "if during the last two weeks the hosting node had submitted at least two ARP requests, then do not uninstall, but if during those two weeks the hosting node had submitted one or zero ARP requests, then uninstall". Another example of a dynamic Boolean uninstalling condition may be "if the hosting node provides a given service on a given network port then do not uninstall, otherwise uninstall".

The above examples of dynamic Boolean uninstalling conditions are based on a single fact relating to the node, but this does not have to be so. A more realistic dynamic Boolean uninstalling condition is a compound condition that combines multiple facts relating to the node. For example, the dynamic Boolean uninstalling condition may be "if sub-condition A is satisfied (e.g. of sub-condition A: "during the last two weeks the hosting node submitted at least one ARP request") OR if sub-condition B is satisfied (e.g. of sub-condition B: "the hosting node provides a given service on a given network port") OR if sub-condition C is satisfied (e.g. of sub-condition C: "the hosting node has a direct connection with a computing device that is outside the networked system") then do not uninstall, otherwise uninstall".

As can be seen from the above compound uninstalling condition example, uninstalling conditions may depend on dynamic events, such as the submission of ARP requests, that cannot be predicted in advance by the penetration testing system. However, uninstalling conditions may additionally depend on static sub-conditions, such as the existence of a connection to an external computing device. Use of static sub-conditions is predictable in advance, and therefore allows for overriding, or preventing, the uninstalling of an agent from a given node. In the above example, the rule ensures that agents that look "uninteresting" because they do not submit ARP requests and do not provide the given service, but actually are "interesting" because their hosting node is directly connected to an external computing device and is a potential breach point of the networked system, will not be uninstalled, thereby maintaining their contribution to future penetration testing campaigns.

As seen from the exemplary sequence illustrated in FIGS. 3A to 3H, in some cases, the uninstallation of agents may be permanent—once a node loses its agent, it no longer participates in future campaigns. In other embodiments, the uninstallation of agents may be reversible—after a predetermined time (e.g. three months) has elapsed since the last initialization in which agents were installed on all relevant nodes (as illustrated in FIG. 3A), the initialization is automatically repeated, and all relevant nodes are restored to having an agent installed thereon. Thus, an agent that was removed from its hosting node because of inactivity of the node is reinstalled, and has a chance to re-evaluate the Boolean uninstalling condition. The re-installation enables the penetration testing system to handle changes to the network, such as changes in network traffic and activity which cause nodes previously thought to be "uninteresting" to become "interesting", and facilitates "bringing agents back to life". In some embodiments, the decision to repeat the initialization is made when a certain condition is satisfied—for example, when the percentage of nodes still having their agents installed falls below a given threshold value. In some embodiments, the initialization may be repeated in response to an explicit command received from the user.

In the example provided above with respect to FIGS. 3A to 3H, the uninstalling condition may be related to a "sliding window" along the time axis, for example depending on the number of ARP requests submitted by the hosting node during the last two weeks. In other cases, an uninstalling condition may be related to the time elapsed since initialization (i.e. installation)—for example depending on the number of ARP requests submitted by the hosting node (or whether ARP requests were submitted) since the most recent initialization.

In some cases, an uninstalling condition may result in maintaining the reconnaissance agent for some duration, and subsequently, when re-evaluated, may result in uninstalling the agent. For example, the condition for uninstalling may be to uninstall the agent if the hosting node is not listening on a given network port. For a specific node, this uninstalling condition may be unsatisfied for a couple of weeks (i.e. the specific node was listening to the given network port during those couple of weeks). Subsequently, the uninstalling condition may become satisfied (i.e. the specific node stops listening to the given network port, for example because of receiving an instruction to stop providing a certain service related to the given port). This scenario results in uninstalling the agent once the uninstalling condition is satisfied, in this case after the node stopped listening.

In some embodiments, the re-evaluation of the uninstalling condition, for example as described with respect to FIG. 3F, may be carried out almost continuously, detecting a change in the result of evaluation within seconds of the occurrence of the change.

In other embodiments, the re-evaluation may be carried out according to a pre-defined schedule which may have a coarser granularity, for example once per day or once per week. In some embodiments, the re-evaluation schedule may be related to the specific uninstalling condition. For example, when using an uninstalling condition which relates to a number of ARP messages sent in a two week period, as described above, there may be no need for re-evaluation of the condition once per minute or even once per hour.

The evaluation of the uninstalling condition and the decision to uninstall may be locally implemented in or by the local agent. Alternatively, the agent may provide data associated with the uninstalling condition to the penetration testing remote computing device, and the evaluation of the uninstalling condition and the decision to uninstall may be implemented by the remote computing device. In such cases, the decision to uninstall (if so decided) may be provided to the agent by the remote computing device, for the agent to uninstall itself.

It is appreciated that uninstalling of an agent from a network node may occur between penetration testing campaigns, or during a penetration testing campaign.

It is appreciated that uninstalling an agent from a network node means deactivating the agent previously installed on the network node, such that the agent does not consume CPU or RAM resources of the network node during future penetration testing campaigns, until the agent is re-installed on the network node.

The uninstalling of an agent may be permanent or temporary. Permanent uninstalling includes deletion of at least a portion of the reconnaissance agent's software code from a storage element of the hosting network node. When re-installing a reconnaissance agent that has been permanently uninstalled, the software code of the agent must be re-downloaded onto the hosting network node.

By contrast, temporary uninstalling results in all of the agent's software code remaining in the storage element of the hosting network node, even though the agent is not active while it is uninstalled. Unlike what happens in permanent uninstalling, temporary uninstalling does not necessarily require downloading of agent's code when re-installing the agent on the network node. The re-installing may be triggered by a manual operation of a user of the hosting network node's or by the hosting network node receiving a suitable command from a remote computing device.

A reconnaissance agent that is temporarily uninstalled from a network node may include a component that is executed each time the network node is booted, in order to determine whether the agent is currently temporarily uninstalled and consequently should be inactive, or whether the agent is currently installed and should be active. An agent that is temporarily uninstalled from a network node may include a component that is executed in response to the network node receiving a command to re-install the agent, in order to re-install the agent and make it active again.

Figure 4A:
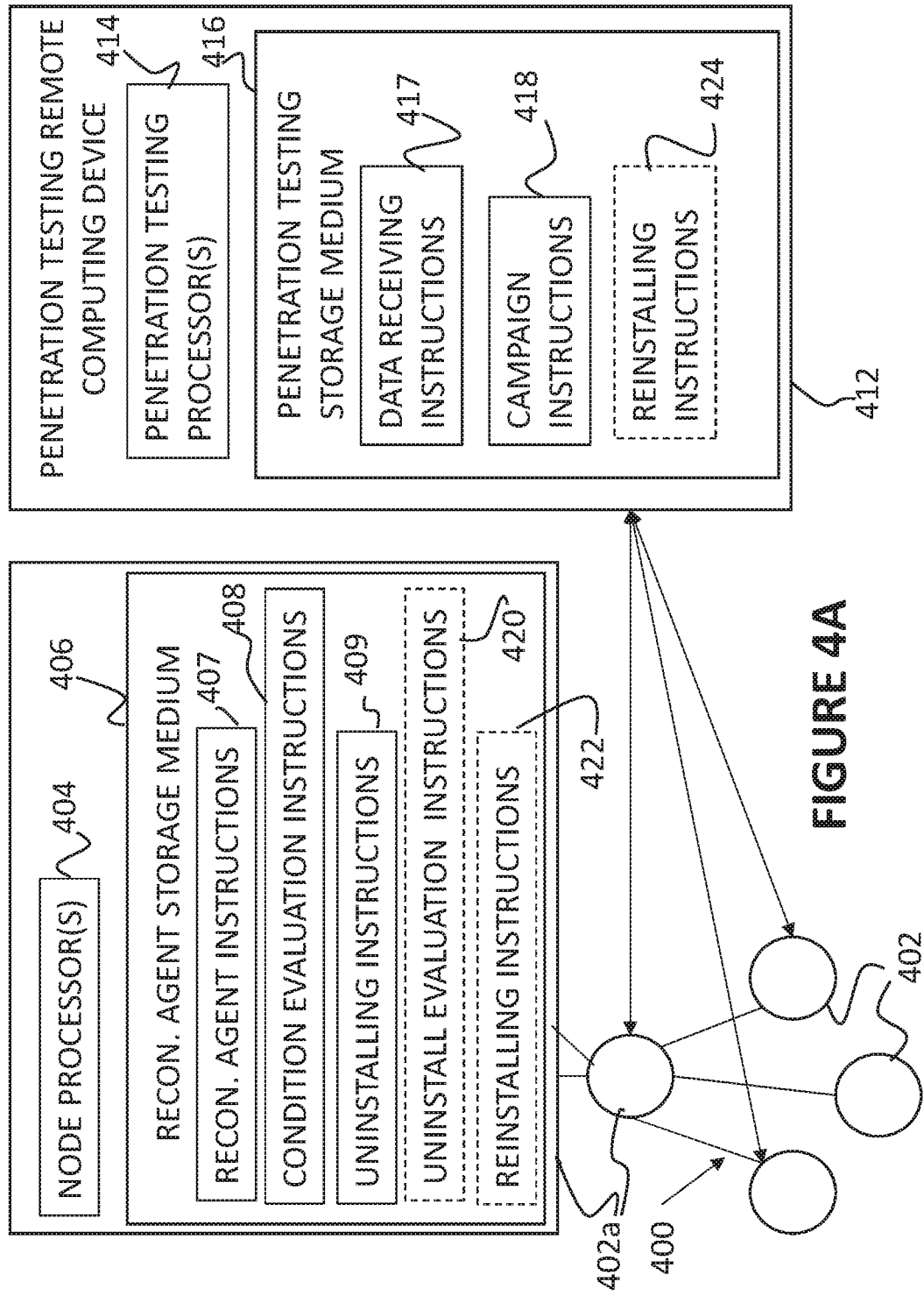
FIGS. 4A and 4B are block diagrams of two embodiments of a system for carrying out a penetration testing campaign according to embodiments of the invention.
Figure 4B:
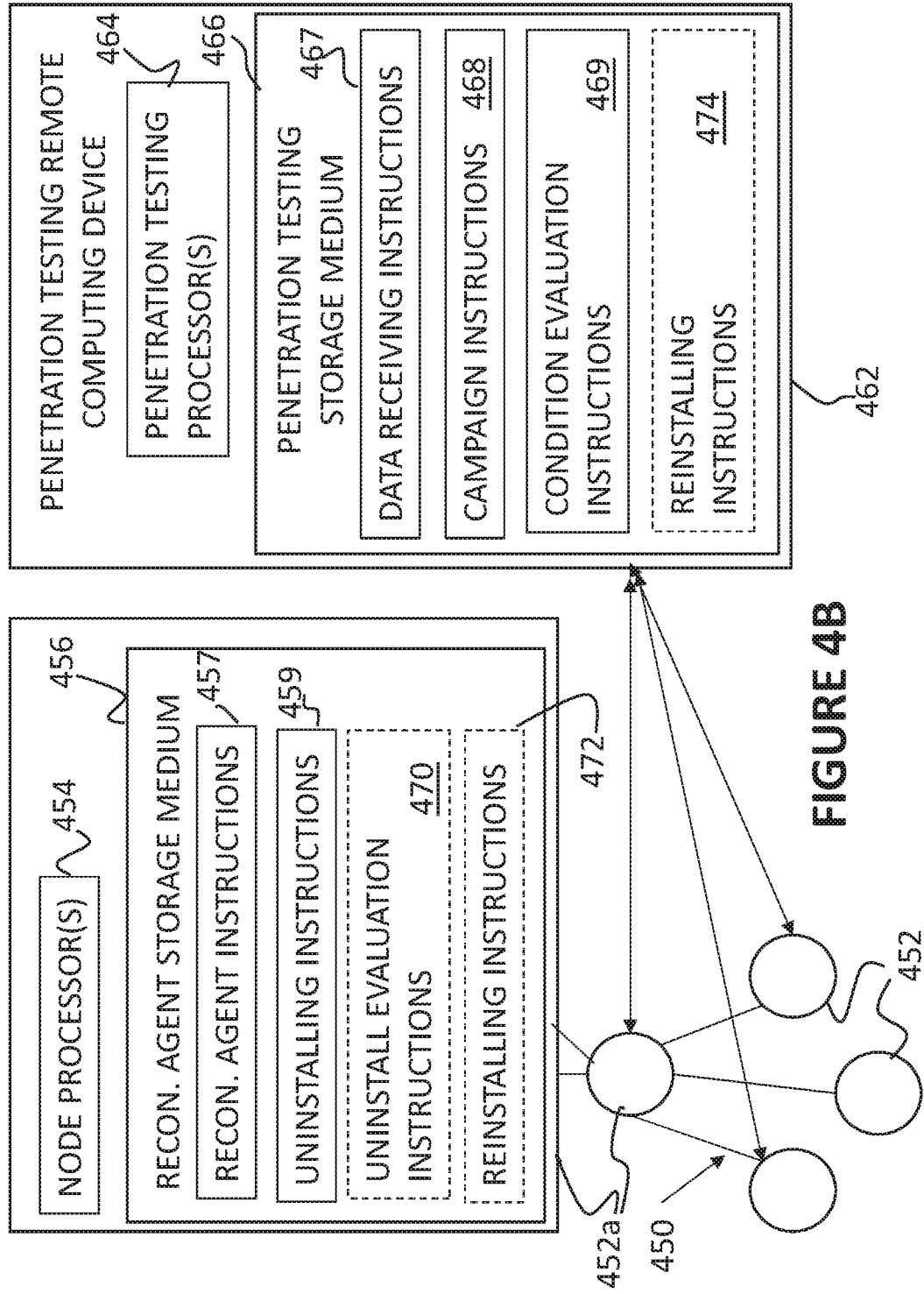

Reference is now made to FIGS. 4A and 4B, which are block diagrams of systems for carrying out a penetration testing campaign according to a first embodiment and a second embodiment of the invention.

As seen in FIG. 4A, according to the first embodiment of the invention, the system is used for carrying out a penetration testing campaign of a networked system 400, which includes multiple network nodes 402. Each network node 402 includes one or more node processors, illustrated as node processor 404 of network node 402a. It is appreciated that though the Figure illustrates only a few nodes, the system is scalable and suitable for any size network.

The system of the first embodiment includes a penetration testing computing device 412, in communication with at least some of the network nodes 402, and in some cases with all of the network nodes 402, here illustrated as being in communication with network node 402a in addition to other nodes 402. The penetration testing computing device 412 includes one or more penetration testing processors 414, and a penetration testing non-transitory computer readable storage medium 416. Storage medium 416 stores instructions for execution by processor(s) 414. Specifically, storage medium 416 has stored:

data receiving instructions 417 that, when executed by processor(s) 414, cause penetration testing computing device 412 to receive data from at least some of network nodes 402 with which it is in communication; and campaign instructions 418 that, when executed by processor(s) 414, cause penetration testing computing device 412 to carry out a penetration testing campaign for testing networked system 400 based on the data received from network nodes 402, for example by execution of instruction 417.

The system further includes a reconnaissance agent non-transitory computer readable storage medium 406, which stores instructions for execution by one or more node processors of one network node 402. In the illustrated embodiment and in the following description, the storage medium 406 forms part of network node 402a and stores instructions for execution by processor 404 of node 402a. However, the structure described herein is equally applicable to any one or more of the network nodes 402.

Stored in reconnaissance agent non-transitory computer readable storage medium 406 are at least the following instructions:

reconnaissance agent instructions 407 that, when executed by processor(s) 404 of node 402a, cause network node 402a to transmit at least a portion of the data received by penetration testing computer device 412 (when computer device 412 executes instructions 417);

condition evaluation instructions 408 that, when executed by processor(s) 404 of node 402a, cause network node 402a to evaluate a dynamic Boolean uninstalling condition for itself (such as the condition described hereinabove with respect to FIGS. 3A and 3B); and uninstalling instructions 409 that, when executed by processor(s) 404 of node 402a, cause network node 402a to uninstall the reconnaissance agent instructions 407 from itself. The uninstalling instructions 409 are executed in response to the condition evaluation instructions 408 determining that the dynamic Boolean uninstalling condition is satisfied for network node 402a.

Turning to FIG. 4B, it is seen that according to the second embodiment of the invention, the system is used for carrying out a penetration testing campaign of a networked system 450, which includes multiple network nodes 452. Each network node 452 includes one or more node processors, illustrated as node processor(s) 454 of network node 452a. It is appreciated that though the Figure illustrates only a few nodes, the system is scalable and suitable for any size network.

The system of the second embodiment includes a reconnaissance agent non-transitory computer readable storage medium 456, which stores instructions for execution by one or more node processors of one network node 452. In the illustrated embodiment and in the following description, the storage medium 456 forms part of network node 452a and stores instructions for execution by processor(s) 454 of node 452a. However, the structure described herein is equally applicable to any one or more of the network nodes 452.

Stored in reconnaissance agent non-transitory computer readable storage medium 456 are at least the following instructions:

reconnaissance agent instructions 457 that, when executed by processor(s) 454 of node 452a, cause network node 452a to transmit from the network node data about the network node; and uninstalling instructions 459 that, when executed by processor(s) 454 of node 452a, cause network node 452a to uninstall the reconnaissance agent instructions 457 from itself.

The system further includes a penetration testing computing device 462, in communication with at least some of the network nodes 452, and in some cases with all of the network nodes 452, here illustrated as being in communication with network node 452a in addition to other nodes 452. The penetration testing computing device 462 includes one or more penetration testing processors 464, and a penetration testing non-transitory computer readable storage medium 466. Storage medium 466 stores instructions for execution by processor(s) 464. Specifically, storage medium 466 has stored:

data receiving instructions 467 that, when executed by processor(s) 464, cause penetration testing computing device 462 to receive data from at least some of network nodes 462 with which it is in communication, including data about network node 452a (for example data transmitted by network node 452a when executing reconnaissance agent instructions 457);

campaign instructions 468 that, when executed by processor(s) 464, cause penetration testing computing device 462 to carry out a penetration testing campaign for testing networked system 450 based on the data received from network nodes 452, for example by execution of instruction 467; and condition evaluation instructions 469 that, when executed by processor(s) 464, cause penetration testing computing device 462 to evaluate a dynamic Boolean uninstalling condition for at least some network nodes 452, and specifically for network node 452a, where the evaluation is based on the data about network node 452a received by execution of instructions 467.

The uninstalling instructions 459 are executed by processor(s) 454 of network node 452a in response to the execution of the condition evaluation instructions 469 determining that the dynamic Boolean uninstalling condition is satisfied for network node 452a.

It is a particular feature of the present invention that the dynamic Boolean uninstalling condition, evaluated by execution of instructions 408 (FIG. 4A) or 469 (FIG. 4B) is a Boolean condition that meets the following requirements with respect to a given network node, such as network node 452a:

i) when evaluated for a given network node at two points in time, the Boolean condition may produce different values, even if network connectivity and an on/off state of a given network node do not change between the two points in time;

ii) at a time of installing the reconnaissance agent software module (i.e. at least instructions 407, 408 and 409 (FIG. 4A) or 457 and 459 (FIG. 4B)) on the given network node, for at least one future time point, it is not possible to predict a value of the Boolean condition for the given network node at the at least one future time point; and iii) any evaluation of whether the Boolean condition is satisfied for the given network node does not depend solely on whether the given network node takes part in a penetration testing campaign at the time of such evaluation.

The following examples are used to clarify the requirements of the dynamic Boolean uninstalling condition, listed hereinabove. For the purpose of the example we assume that the system of the invention is installed in a network, and the reconnaissance agent instructions are installed on a specific network node (402a or 452a) on Jan. 10, 2019.

i) Consider the Boolean condition used hereinabove with respect to FIGS. 3A to 3H, which states "uninstall if and only if the node has submitted fewer than two ARP requests in the last two weeks". Note that such Boolean condition should be interpreted to say "uninstall if and only if the node has submitted fewer than two ARP requests in the last two weeks, provided the agent was installed during all of those last two weeks", implying the condition is never satisfied during the first two weeks following installation. Assuming that the specific network node sent its first ARP request on Jan. 15, 2019 at 12:00 pm, sent the next ARP request on Jan. 19, 2019 at 11:00 am and then stopped sending ARP messages, then when the Boolean condition is evaluated at any time from installation up until 12:00 pm on Jan. 29, 2019, the condition would not be met (initially because we are within the initial two-weeks period, and later because the node sent two ARP requests during the most recent two weeks). However, when the condition is evaluated at 12:01 pm on Jan. 29, 2019, the condition would be met, because only one ARP request was submitted by the node in the two weeks preceding the time of evaluation. As such, the value of the condition is different at the different points in time, regardless of the state or connectivity of the network node.

On the other hand, for a specific node, the Boolean condition "the specific node has a direct connection with a computing device that is outside the networked system" will produce the same value at each evaluation, as long as the network connectivity doesn't change. As such, this condition does not produce different values when evaluated for a given network node at two points in time when network connectivity does not change between the two points in time, and thus does not meet the first requirement of dynamic Boolean uninstalling conditions.

ii) Relating back to the exemplary condition of FIGS. 3A to 3H regarding sending of ARP requests, because the number of ARP requests submitted by a network node depends on how the node will be used, this number is not a predictable number. As such, at the time of installation of the reconnaissance agent instructions, on a given network node, it is not possible to predict how many ARP requests the node will submit in the future, not for a specific point in time (e.g. how many ARP requests will be submitted by 12:00 pm on Jan. 5, 2019) and typically not for any point in time, and the condition meets the second requirement listed above for being a dynamic Boolean condition.

On the other hand, for a specific node, the Boolean condition "the specific node has Windows® operating system installed thereon" is typically not a condition that changes—the operating system is rarely changed, and even if it were changed, a different version of the reconnaissance agent would have to be installed, so from the perspective of the current agent, it is impossible to detect a change of operating system. Therefore, for a specific network node that has a Windows operating system installed at a specific point in time, one can predict with relatively high accuracy that this Boolean condition will also be true 15 minutes (or even 15 days) later.

iii) Relating back to the exemplary condition of FIGS. 3A to 3H regarding sending of ARP requests, as mentioned above a network node sends ARP request based on its use, regardless of any background processes carried out in the node, such as a penetration testing campaign. In fact, even in networks for which no penetration testing is ever conducted, some nodes send ARP requests. As such, the evaluation of this condition for the given network node does not depend solely (or at all) on whether the given network node takes part in a penetration testing campaign at the time of such evaluation, and the condition meets the third requirement listed above for being a dynamic Boolean condition.

On the other hand, for a specific node, the Boolean condition "currently provides data to a penetration testing system" will be entirely dependent on the participation of the node in a penetration testing campaign—if the node does not participate in a campaign, there is no need for it to, and it will not, transmit data to the penetration testing system. As such, this condition does not meet the third requirement above.

As discussed hereinabove, in some embodiments, the dynamic Boolean uninstalling condition evaluated by the condition evaluation instructions 408 (FIG. 4A) or 469 (FIG. 4B) depends on, or is a logical combination of, multiple dynamic Boolean sub-condition. Each one of the multiple dynamic Boolean sub-condition is related to the specific network node for which it is evaluated, which, in the examples of FIGS. 4A and 4B, are nodes 402*a* and 452*a* respectively.

In some embodiments, the dynamic Boolean uninstalling condition depends on a static Boolean sub-condition related to the specific network node for which it is evaluated, in addition to depending on one or more dynamic Boolean sub-conditions. For example, the Boolean sub-condition "the network node is connected to at least one computing device external to the tested networked system" is a static condition, as a penetration testing campaign's goal is to test the current configuration of the tested networked system and therefore connections to external devices must be considered unchangeable during the campaign.

In some embodiments, the dynamic Boolean uninstalling condition depends on a given event type occurring at least a given number of times during a time interval of a given length immediately preceding the current time. For example, the condition discussed hereinabove with respect to FIGS. 3A to 3H relates to sending of ARP requests (a given event type) occurring at least twice within two weeks preceding the time of evaluation. Another example of this type of dynamic Boolean uninstalling condition may be "uninstall if fewer than ten SQL queries were submitted from this node to a given database server during the last week".

In some embodiments, the dynamic Boolean uninstalling condition depends on a given event type occurring at least a given number of times since the reconnaissance agent software module, including instructions 407, 408 and 409 (FIG. 4A) or 457 and 459 (FIG. 4B) was last installed in the specific network node. For example, such a condition may be "uninstall if more than 3 requests of type X were submitted from this node since the last installation of the reconnaissance agent software module".

In some embodiments, the condition evaluation instructions 408 (FIG. 4A) or 469 (FIG. 4B) include instructions to determine a value of the dynamic Boolean uninstalling condition at multiple points in time, where for each such point in time, except the last one, the value of the dynamic Boolean uninstalling condition is determined to be false for the specific network node, such as node 402*a* or 452*a*. Stated differently, the dynamic Boolean uninstalling condition is evaluated at multiple points in time, as long as its value remains false. The instructions to determine the value at multiple points in time may be automatically executed according to a pre-defined schedule, such as once per a given number of seconds, once per a given number of minutes, once per a given number of hours, once per a given number of days, once per a given number of weeks, or once per a given number of months. For example, the instructions may implement "evaluate the Boolean condition 'the network node has sent at least two ARP requests in the past two weeks' once a day".

In some embodiments, the execution of the instructions to determine the value of the condition at one of the multiple points in time is carried out in response to completion of execution of the instructions to determine the value of the condition at another of the multiple points in time. Stated differently, in some such embodiments, one evaluation of the condition is immediately followed by another evaluation of the condition, as long as the value of the condition remains false.

In some embodiments, the uninstalling instructions 409 (FIG. 4A) or 459 (FIG. 4B) are instructions to permanently uninstall at least the reconnaissance agent instructions 407 (FIG. 4A) or 457 (FIG. 4B) from the network node 402a (FIG. 4A) or 452a (FIG. 4B), respectively. For example, such permanent uninstalling may include deletion of the reconnaissance agent instructions from the storage medium 406 (FIG. 4A) or 456 (FIG. 4B).

In some other embodiments, the uninstalling instructions 409 (FIG. 4A) or 459 (FIG. 4B) are instructions to temporarily uninstall at least the reconnaissance agent instructions 407 (FIG. 4A) or 457 (FIG. 4B) from the network node 402a (FIG. 4A) or 452a (FIG. 4B), respectively.

In some embodiments in which the uninstalling is temporary, referring to FIG. 4A, the reconnaissance agent instructions 407 may remain on storage medium 406 and be ignored while they are temporarily uninstalled. In some such embodiments, the reconnaissance agent non-transitory computer readable storage medium 406 may further have stored uninstall evaluation instructions 420, to be executed when powering-up network node 402a, to determine whether reconnaissance agent instructions 407 are currently temporarily uninstalled from network node 402a. Similarly, for FIG. 4B, the reconnaissance agent instructions 457 may remain on storage medium 456 and be ignored while they are temporarily uninstalled. In some such embodiments, the reconnaissance agent non-transitory computer readable storage medium 456 may further have stored uninstall evaluation instructions 470, to be executed when powering-up network node 452a, to determine whether reconnaissance agent instructions 457 are currently temporarily uninstalled from network node 452a.

In some embodiments, in FIG. 4A, the reconnaissance agent non-transitory computer readable storage medium 406 may further have stored reinstalling instructions 422, to be executed in response to network node 402a, receiving a command to reinstall the reconnaissance agent instructions 407. When reinstalling instructions 422 are executed by processor(s) 404, they cause the reconnaissance agent instructions 407 to become active. Similarly, in FIG. 4B, the reconnaissance agent non-transitory computer readable storage medium 456 may further have stored reinstalling instructions 472, to be executed in response to network node 452a, receiving a command to reinstall the reconnaissance agent instructions 457. When reinstalling instructions 472 are executed by processor(s) 454, they cause the reconnaissance agent instructions 457 to become active.

In some embodiments, in FIG. 4A, the penetration testing non-transitory computer readable storage medium 416 may further have stored reinstalling instructions 424 which, when executed by processor(s) 414, cause at least one network node 402 from which the reconnaissance agent instructions 407 were previously uninstalled to reinstall the reconnaissance agent instructions. The re-installation caused by reinstalling instructions 424 may be complete reinstalling of reconnaissance agent instructions 407 that were permanently uninstalled, or may be reinstalling or reactivating of reconnaissance agent instructions 407 that were temporarily uninstalled as explained hereinabove.

Similarly, in FIG. 4B, the penetration testing non-transitory computer readable storage medium 466 may further have stored reinstalling instructions 474 which, when executed by processor(s) 464, cause at least one network node 452 from which the reconnaissance agent instructions 457 were previously uninstalled to reinstall the reconnaissance agent instructions. The re-installation caused by reinstalling instructions 474 may be complete reinstalling of reconnaissance agent instructions 457 that were permanently uninstalled, or may be reinstalling or reactivating of reconnaissance agent instructions 457 that were temporarily uninstalled as explained hereinabove.

In some embodiments, execution of the reinstalling instructions 424 or 474 is automatically carried out according to a pre-defined schedule, which may be a periodic schedule. For example, the reinstalling instructions 424 or 474 are carried out once a month, and cause reinstallation of the reconnaissance agent instructions 407 or 457 in all nodes 402 or 452, respectively, from which the reconnaissance agent instructions had been uninstalled.

In some other embodiments, execution of the reinstalling instructions 424 or 474 is automatically carried out in response to a manual command. For example, the CISO of the organization may instruct the penetration testing computing device to reinstall reconnaissance agent instructions on all nodes of the network prior to initiating a new phase of penetration testing.

In yet other embodiments, execution of the reinstalling instructions 424 or 474 is automatically carried out in response to a given condition becoming satisfied. For example, the condition may be "reinstall reconnaissance agent instructions on all nodes of the network when the number of nodes which do not have reconnaissance agent instructions installed is greater than 80% of the number of nodes in the network".

Figure 5:
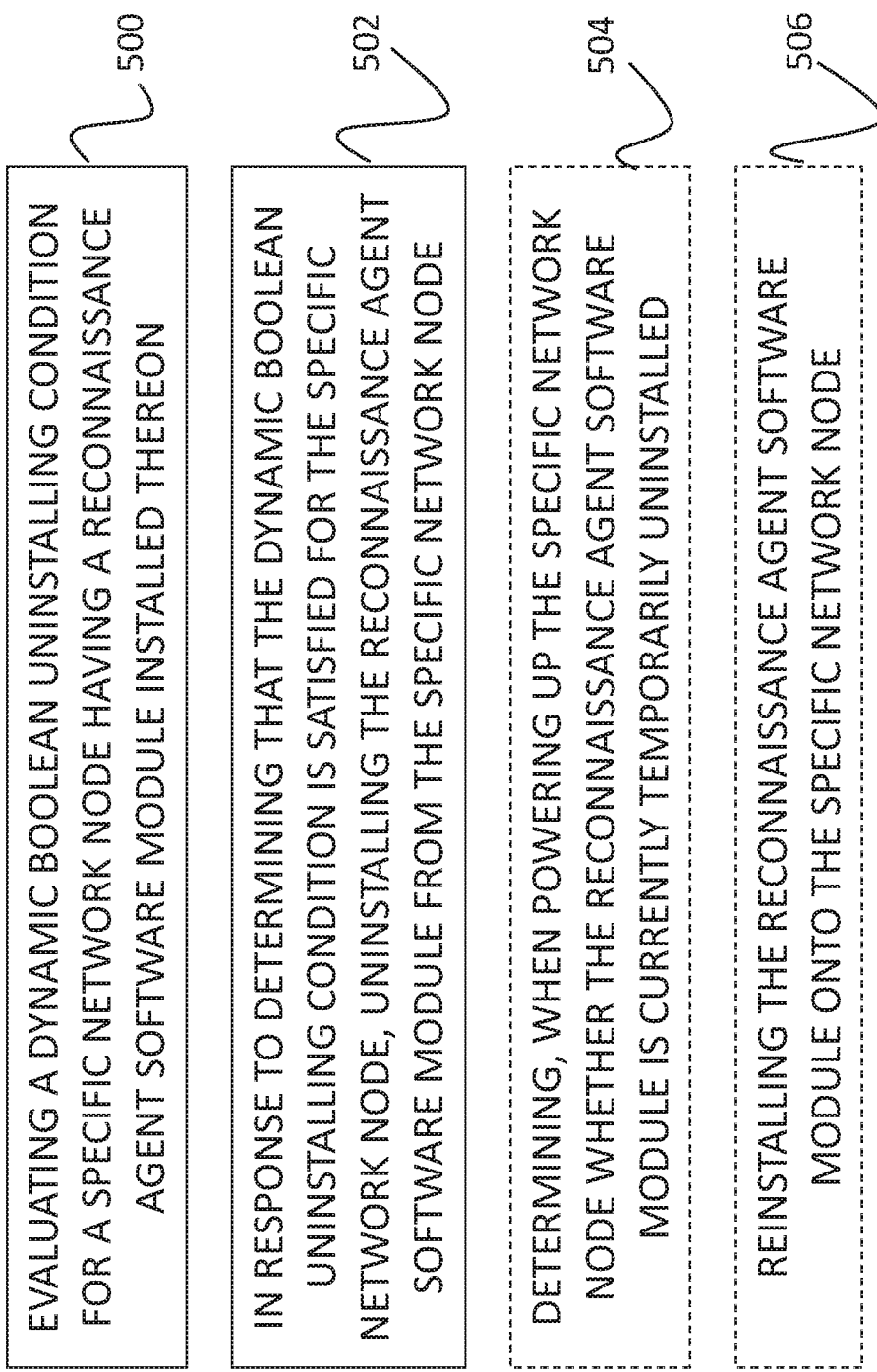
FIG. 5 is a flow chart of a method for carrying out a penetration testing campaign according to an embodiment of the invention.

Reference is now additionally made to FIG. 5, which is a flow chart of a method for carrying out a penetration testing campaign according to an embodiment of the invention.

The method of FIG. 5 is useful for carrying out a penetration testing campaign of a networked system 400, which includes multiple network nodes 402 by a penetration testing system, as illustrated in FIG. 4A. As shown in FIG. 4A, the penetration testing system includes a penetration testing software module, in the form of instructions 417 and 418 installed on storage medium 416 of penetration testing computing device 412 which is remote from the networked system 400. The penetration testing system further includes a reconnaissance agent software module, in the form of instructions 407, 408 and 409 stored on storage medium 406 of at least some network nodes 402.

Similarly, the method of FIG. 5 is useful for carrying out a penetration testing campaign of a networked system 450, which includes multiple network nodes 452 by a penetration testing system, as illustrated in FIG. 4B. As shown in FIG. 4B, the penetration testing system includes a penetration testing software module, in the form of instructions 467, 468, and 469 installed on storage medium 466 of penetration testing computing device 462 which is remote from the networked system 450. The penetration testing system further includes a reconnaissance agent software module, in the form of instructions 457 and 459 stored on storage medium 456 of at least some network nodes 452.

Initially, at step 500, for a specific network node (402a, 452a) having the reconnaissance agent software module, including instructions 407, 408 and 409 (FIG. 4A) or 457 and 459 (FIG. 4B) installed thereon, evaluating a dynamic Boolean uninstalling condition for the specific network node.

The characteristics, structure, and requirements of the dynamic Boolean uninstalling condition are described at length hereinabove with respect to FIGS. 4A and 4B.

In some embodiments, the evaluating at step 500 is at least partially carried out by the reconnaissance agent software module installed on the specific network node. For example, when implementing the method using the system of FIG. 4A, the evaluating is carried out by processor(s) 404 executing condition evaluating instructions 408 of the reconnaissance agent software module.

In some embodiments, the evaluating at step 500 is at least partially carried out by the penetration testing software module installed on the remote penetration testing computing device. For example, when implementing the method using the system of FIG. 4B, the evaluating is carried out by processor(s) 464 of the penetration testing computing device 462 executing condition evaluating instructions 469 thereof.

In some embodiments, the evaluating at step 500 includes determining a value of the dynamic Boolean uninstalling condition at multiple points in time, wherein, for each of those multiple points in time except for the last, the value of the dynamic Boolean uninstalling condition is determined to be false for the specific network node. Stated differently, the dynamic Boolean uninstalling condition is evaluated at multiple points in time, as long as its value remains false.

In some such embodiments, the determining of the value at the multiple points in time is automatically carried out according to a pre-defined schedule. In some cases, the pre-defined schedule is a periodic schedule, such as once per a given number of seconds, once per a given number of minutes, once per a given number of hours, once per a given number of days, once per a given number of weeks, or once per a given number of months.

In some embodiments, the determining of the value for one of the multiple points in time starts in response to completing the determining of the value for another of the multiple points in time. Stated differently, in these embodiments, one evaluation of the condition is immediately followed by another evaluation of the condition, as long as the value of the condition remains false.

At step 502, in response to determining that the dynamic Boolean uninstalling condition is satisfied for the specific network node, uninstalling the reconnaissance agent software module from the specific network node, for example by processor(s) 404 executing uninstalling instructions 409 to cause the uninstallation of reconnaissance agent instructions 407 from the specific network node, or by processor(s) 454 executing uninstalling instructions 459 to cause the uninstallation of reconnaissance agent instructions 457 from the specific network node.

In some embodiments, the uninstalling at step 502 is permanently uninstalling.

In other embodiments, the uninstalling at step 502 is temporarily uninstalling. In some such embodiments in which the uninstalling is temporary, the method further includes at step 504, determining, when powering-up the specific network node whether the reconnaissance agent software module is currently temporarily uninstalled in the specific network node. Step 504 may be carried out by processor(s) 404 executing instructions 420 or by processor(s) 454 executing instructions 470.

In some embodiments, the method further includes a reinstalling step 506, at which the reconnaissance agent software module is reinstalled onto the specific network node which does not have the reconnaissance agent software module currently installed.

In some embodiments, reinstalling step 506 is carried out by execution of instructions 422 or 472 of the reconnaissance agent software module, in response to the specific network node receiving a command to re-install the reconnaissance agent software module. Execution of instructions 422 or 472 causes the reconnaissance agent software module to become active after having been permanently uninstalled or temporarily uninstalled.

In some embodiments, reinstalling step 506 is initiated by execution of instructions 424 or 474 of the penetration testing computing device, for example by the penetration testing computing device instructing at least some network nodes to reinstall the reconnaissance agent software module.

In some such embodiments, the reinstalling is automatically carried out according to a predefined schedule, which may be a periodic schedule. For example, the reinstalling on a specific node may be scheduled to occur one month after the last time the reconnaissance agent software module was installed on that specific node, or on all nodes.

In other such embodiments, the reinstalling is carried out in response to a manual command, for example a manual command provided via a user interface associated with the penetration testing computing device.

In yet other such embodiments, the reinstalling is carried out in response to a given condition becoming satisfied. For example, the condition may say "reinstall the reconnaissance agent software module on all nodes if and only if the number of nodes in which the reconnaissance agent software module is installed is smaller than 1000".

Definitions

This disclosure should be interpreted according to the definitions below. In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "attacker" or "threat actor"—An entity, whether a single person, a group of persons or an organization, that might conduct an attack against a networked system by penetrating it for uncovering its security vulnerabilities and/or for compromising it.

23. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

24. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

25. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

26. "network nodes A and B are immediate neighbors of each other"—Network nodes A and B have a direct communication link between them that does not pass through any other network node.

27. "penetration testing by simulation" or "simulated penetration testing"-Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

28. "penetration testing by actual attack" or "actual attack penetration testing" or "penetration testing by actual exploit" or "actual exploit penetration testing"-Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

29. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

30. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

31. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

32. "uninstalling an agent from a network node"—Deactivating the agent (either a reconnaissance agent or an attack agent) previously installed on the network node such that it does not consume CPU or RAM resources of the network node in future penetration testing campaigns until being re-installed on the network node. The uninstalling may be permanently uninstalling or temporarily uninstalling.

33. "permanently uninstalling an agent from a network node"—Uninstalling the agent from the network node including deletion of at least a portion of the agent's code from the storage of the network node. Following permanently uninstalling the agent from the network node, re-installing the agent on the network node requires downloading agent's code to the network node.

34. "temporarily uninstalling an agent from a network node"—Uninstalling the agent from the network node resulting in all of the agent's code still kept in the storage of the network node. Following temporarily uninstalling the agent from the network node, re-installing the agent on the network node does not necessarily require downloading agent's code to the network node. The re-installing may be caused by a manual command of the user of the network node or by a command received in the network node from a remote computing device. An agent that is temporarily uninstalled from a network node may include a component that is executed when booting the network node in order to check whether the agent is currently temporarily uninstalled and consequently should be inactive. An agent that is temporarily uninstalled from a network node may include a component that is executed in response to receiving by the network node of a command to re-install the agent, in order to make the agent active.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

37. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

38. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

39. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.
40. "resource of a network node"—A file in the network node, a folder in the network node, credentials of a user residing in the network node (the credentials not necessarily applying to the network node containing the credentials), a peripheral device of the network node or a communication device accessible to the network node.
41. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.
42. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.
43. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.
44. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.
45. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.
46. "session-hijacking attack"—a cyber-attack where a valid communication session between two network nodes in a networked system is used by an attacker to gain unauthorized access to information or services in the networked computer system.
47. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.
48. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

49. "administrator of a network node"—Any person that is authorized, among other things, to define or change at least one rule controlling at least one of an access right, a permission, a priority and a configuration in the network node.
50. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.
51. "remote computing device" or "penetration testing remote computing device" (with respect to a given networked system)—A computing device that executes software implementing part or all of the penetration testing software module that is used for testing the given networked system.
    A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.
    A remote computing device may (i) be a dedicated computing device that is dedicated only to doing penetration testing, or (ii) also implement other functionality not directly related to penetration testing.
    A remote computing device is not limited to be a single physical device with a single processing unit. It may be implemented by multiple separate physical devices packaged in separate packages that may be located at different locations. Each of the separate physical devices may include one or multiple processing units.
    A remote computing device may be (i) a physical computing device, or (ii) a virtual machine running inside a physical computing device on top of a hosting operating system.
52. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.
    Note that changing the access rights of a file is not considered damaging the file.
53. "damaging a network node"—Carrying out an operation related to the network node that is not allowed by the owner of the network node and that causes a change of state in the network node or in some resource related to the network node.
    Examples of operations damaging a network node are: (i) damaging a file residing in the network node, (ii) exporting a file (or a portion of it) residing in the network node out of the network node, (iii) shutting down the network node, (iv) shutting down or disabling a service provided by the network node, or (v) closing or disabling a software application executing in the network node.
54. "explicitly selecting"—Directly and clearly selecting, by a human user, of one option out of multiple options available to the human user, leaving no room for doubt and not relying on making deductions by a computing device.
    Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.
    Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.
55. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.
    An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.
    An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.
56. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

57. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

58. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

59. "random selection"—A selection that depends on a random or pseudo-random factor. Different possible outcomes in a random selection do not necessarily have the same probabilities of being selected.

60. "a Boolean condition"—A statement that can have a value of either true or false. If the statement is true, we say that the Boolean condition is satisfied. If the statement is false, we say that the Boolean condition is not satisfied.

61. "a dynamic Boolean condition" (for a given network node)—A Boolean condition whose value is related to the given network node, and which satisfies both of the two requirements listed below.

The first requirement is that the value of the Boolean condition may change with time even if the network connectivity and the on/off state of the given network node do not change.

Note that a Boolean condition deriving its ability to change with time only from conditions related to powering-up, shutting-down or changing the connectivity of the given network node is not considered to be a dynamic Boolean condition. Also note that a dynamic Boolean condition may depend on one or more static conditions, but as long as its value may sometimes change with time because of its dependency on at least one other factor, it is considered a dynamic Boolean condition.

Examples of Boolean conditions that satisfy the first requirement for being dynamic are "the given network node had sent three ARP requests during the last 24 hours" and "the given network node had sent three ARP requests during the last 24 hours AND the given network node has a cellular communication channel". Note that in the latter example, if the given network node does not have a cellular communication channel, the Boolean condition is predictably known to always be false for the given network node regardless of the number of ARP requests being sent and therefore does not change with time for the given network node. However, that condition satisfies the first requirement for being a dynamic condition because when the given network node has a cellular communication channel it may change with time.

Examples of Boolean conditions that do not satisfy the first requirement for being dynamic are "the given network node is currently booting up" and "the given network node has a cellular communication channel".

The second requirement is that, in at least one time point, it is not possible to predict a value of the Boolean condition for the given network node in at least one future time point.

Examples of Boolean conditions that satisfy the second requirement for being dynamic are "the given network node had sent three ARP requests during the last 24 hours" and "the working memory (RAM) of the given network node is more than 90% full". Examples of Boolean conditions that that do not satisfy the second requirement for being dynamic are "the amount of physical working memory (RAM) of the given network node is at least 8 GB" and "the given network node uses the Windows OS". Note that the last two examples do not satisfy the second requirement even though RAM memory and OS may be changed by maintenance operations. However, such operations require powering down of the given node, and therefore they are considered not to satisfy the second requirement.

62. "a static Boolean condition" (for a given network node)—A Boolean condition whose value is related to the given network node that is not a dynamic Boolean condition for the given network node.

63. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/ subgroup of a given set/group may contain all the members of the given set/group and be equal to the given set/group.

64. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

65. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

66. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of carrying out a penetration testing campaign of a networked system including multiple network nodes by a penetration testing system, the penetration testing system comprising (A) a penetration testing software module installed on a remote computing device and (B) a reconnaissance agent software module installed on at least some network nodes of the multiple network nodes, the method comprising:
   a. for one network node of said at least some network nodes, evaluating a dynamic Boolean uninstalling condition;
   b. in response to determining that said dynamic Boolean uninstalling condition is satisfied for said one network node, uninstalling the reconnaissance agent software module from said one network node,
   wherein said dynamic Boolean uninstalling condition is a Boolean condition (i) that when evaluated for a given network node at two points in time, may produce different values even if network connectivity and an on/off state of said given network node do not change between said two points in time, (ii) that at a time of installing the reconnaissance agent software module on said given network node, for at least one future time point, it is not possible to predict a value of said Boolean condition for said given network node at said at least one future time point, and (iii) for which any evaluation of whether said Boolean condition is satisfied for said given network node does not depend solely on whether said given network node takes part in a penetration testing campaign at the time of said evaluation.

2. The method of claim 1, wherein said dynamic Boolean uninstalling condition depends on multiple dynamic Boolean sub-conditions, each dynamic Boolean sub-condition of said multiple dynamic Boolean sub-conditions being related to said one network node.

3. The method of claim 1, wherein said dynamic Boolean uninstalling condition depends on a static Boolean sub-condition related to said one network node, in addition to depending on one or more dynamic Boolean sub-conditions.

4. The method of claim 1, wherein said dynamic Boolean uninstalling condition depends on a given event type occurring at least a given number of times during a time interval of a given length immediately preceding the current time.

5. The method of claim 1, wherein said dynamic Boolean uninstalling condition depends on a given event type occurring at least a given number of times since the reconnaissance agent software module was last installed in said one network node.

6. The method of claim 1, wherein said evaluating of said dynamic Boolean uninstalling condition for said one network node is at least partially carried out by the reconnaissance agent software module installed on said one network node.

7. The method of claim 1, wherein said evaluating of said dynamic Boolean uninstalling condition for said one network node is at least partially carried out by the penetration testing software module installed on the remote computing device.

8. The method of claim 1, wherein said evaluating of said dynamic Boolean uninstalling condition for said one network node includes determining a value of said dynamic Boolean uninstalling condition at multiple points in time, wherein, for each point in time of said multiple points in time except a last of said multiple points in time, said value of said dynamic Boolean uninstalling condition is determined to be false for said one network node.

9. The method of claim 8, wherein said determining of said value at said multiple points in time is automatically carried out according to a pre-defined schedule.

10. The method of claim 8, wherein said determining of said value at said multiple points in time includes starting determining of said value for one of said multiple points in time in response to completing determining of said value for another of said multiple points in time.

11. The method of claim 1, wherein said uninstalling is permanently uninstalling.

12. The method of claim 1, wherein said uninstalling is temporarily uninstalling.

13. The method of claim 12, wherein the reconnaissance agent software module includes a component that is executed when powering-up said one network node, wherein execution of said component determines whether the reconnaissance agent software module is currently temporarily uninstalled in said one network node.

14. The method of claim 12, wherein the reconnaissance agent software module includes a component that is executed in response to said one network node receiving a command to re-install the reconnaissance agent software module, wherein execution of said component causes said reconnaissance agent software module to become active.

15. The method of claim 1, further comprising:
c. re-installing the reconnaissance agent software module on at least one network node of said at least some network nodes from which the reconnaissance agent software module was previously uninstalled.

16. The method of claim 15, wherein said re-installing of the reconnaissance agent software module is automatically carried out according to a pre-defined schedule.

17. The method of claim 15, wherein said re-installing of the reconnaissance agent software module is carried out in response to a manual command.

18. The method of claim 15, wherein said re-installing of the reconnaissance agent software module is carried out in response to a given condition becoming satisfied.

19. A system for carrying out a penetration testing campaign of a networked system including multiple network nodes, each network node of the multiple network nodes including one or more node processors, the system comprising:
a. a penetration testing computing device in communication with at least some network nodes of the multiple network nodes, the penetration testing computing device comprising:
 i. one or more penetration testing processors; and
 ii. a penetration testing non-transitory computer readable storage medium for instructions execution by said one or more penetration testing processors, said penetration testing non-transitory computer readable storage medium having stored:
  A. data receiving instructions that, when executed by said one or more penetration testing processors, cause said penetration testing computing device to receive data from said at least some network nodes; and
  B. campaign instructions that, when executed by said one or more penetration testing processors, cause said penetration testing computing device to carry out the penetration testing campaign for testing the networked system based on said data received from said at least some network nodes; and
b. a reconnaissance agent non-transitory computer readable storage medium for instructions execution by the one or more node processors of one network node of said at least some network nodes, said reconnaissance agent non-transitory computer readable storage medium having stored:
 i. reconnaissance agent instructions that, when executed by said one or more node processors of said one network node, cause said one network node to transmit from said one network node at least a portion of said data received by said penetration testing computing device;
 ii. condition evaluation instructions that, when executed by said one or more node processors of said one network node, cause said one network node to evaluate a dynamic Boolean uninstalling condition for said one network node; and
 iii. uninstalling instructions that, when executed by said one or more node processors of said one network node, cause said one network node to uninstall said reconnaissance agent instructions from said one network node, wherein said uninstalling instructions are executed in response to the condition evaluation instructions determining that said dynamic Boolean uninstalling condition is satisfied for said one network node,
wherein said dynamic Boolean uninstalling condition is a Boolean condition (i) that when evaluated for a given network node at two points in time, may produce different values even if network connectivity and an on/off state of said given network node do not change between said two points in time, (ii) that at a time of installing said reconnaissance agent instructions on said given network node, for at least one future time point, it is not possible to predict a value of said Boolean condition for said given network node at said at least one future time point, and (iii) for which any evaluation of whether said Boolean condition is satisfied for said given network node does not depend solely on whether said given network node takes part in a penetration testing campaign at the time of said evaluation.

20. A system for carrying out a penetration testing campaign of a networked system including multiple network nodes, each network node of the multiple network nodes including one or more node processors, the system comprising:

a. a reconnaissance agent non-transitory computer readable storage medium for instructions execution by the one or more node processors of one network node of the multiple network nodes, said reconnaissance agent non-transitory computer readable storage medium having stored:
      i. reconnaissance agent instructions that, when executed by said one or more node processors of said one network node, cause said one network node to transmit from said one network node data about said one network node; and
      ii. uninstalling instructions that, when executed by said one or more node processors of said one network node, cause said one network node to uninstall said reconnaissance agent instructions from said one network node; and
   b. a penetration testing computing device in communication with at least some network nodes of the multiple network nodes, wherein said at least some network nodes include said one network node, said penetration testing computing device comprising:
      i. one or more penetration testing processors; and
      ii. a penetration testing non-transitory computer readable storage medium for instructions execution by said one or more penetration testing processors, said penetration testing non-transitory computer readable storage medium having stored:
         A. data receiving instructions that, when executed by said one or more penetration testing processors, cause said penetration testing computing device to receive data from said at least some network nodes, said received data including said data about said one network node;
         B. campaign instructions that, when executed by said one or more penetration testing processors, cause said penetration testing computing device to carry out the penetration testing campaign for testing the networked system based on said data received from said at least some network nodes; and
         C. condition evaluation instructions that, when executed by said one or more penetration testing processors, cause said penetration testing computing device to evaluate a dynamic Boolean uninstalling condition for said one network node, the evaluation being based on said data about said one network node, wherein said uninstalling instructions are executed by said one or more node processors of said one network node in response to said condition evaluation instructions determining that said dynamic Boolean uninstalling condition is satisfied for said one network node, wherein said dynamic Boolean uninstalling condition is a Boolean condition (i) that when evaluated for a given network node at two points in time, may produce different values even if network connectivity and an on/off state of said given network node do not change between said two points in time, (ii) that at a time of installing said reconnaissance agent instructions on said given network node, for at least one future time point, it is not possible to predict a value of said Boolean condition for said given network node at said at least one future time point, and (iii) for which any evaluation of whether said Boolean condition is satisfied for said given network node does not depend solely on whether said given network node takes part in a penetration testing campaign at the time of said evaluation.

\* \* \* \* \*